United States Patent
Yi et al.

(10) Patent No.: US 10,524,255 B2
(45) Date of Patent: Dec. 31, 2019

(54) METHOD AND APPARATUS FOR HANDLING DC SUBCARRIER IN NR CARRIER IN WIRELESS COMMUNICATION SYSTEM

(71) Applicant: LG ELECTRONICS INC., Seoul (KR)

(72) Inventors: Yunjung Yi, Seoul (KR); Byounghoon Kim, Seoul (KR); Hanbyul Seo, Seoul (KR); Hyunsoo Ko, Seoul (KR); Kijun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 44 days.

(21) Appl. No.: 15/654,603

(22) Filed: Jul. 19, 2017

(65) Prior Publication Data

US 2018/0035416 A1 Feb. 1, 2018

Related U.S. Application Data

(63) Continuation of application No. PCT/KR2017/005855, filed on Jun. 5, 2017.

(60) Provisional application No. 62/476,628, filed on Mar. 24, 2017, provisional application No. 62/420,532, filed on Nov. 10, 2016, provisional application No. 62/407,522, filed on Oct. 13, 2016, provisional application No. 62/367,113, filed on Jul. 27, 2016, provisional application No. 62/339,094, filed on May 20, 2016.

(51) Int. Cl.
*H04W 72/04* (2009.01)
*H04L 5/00* (2006.01)
*H04W 88/02* (2009.01)

(52) U.S. Cl.
CPC ........ *H04W 72/044* (2013.01); *H04L 5/0037* (2013.01); *H04L 5/0092* (2013.01); *H04W 72/0406* (2013.01); *H04L 5/0091* (2013.01); *H04W 88/02* (2013.01)

(58) Field of Classification Search
CPC ... H04L 5/0037; H04L 5/0091; H04L 5/0092; H04L 5/003; H04W 72/04; H04W 72/0406; H04W 88/02; H04W 72/044
USPC ........................................ 370/330
See application file for complete search history.

(56) References Cited

U.S. PATENT DOCUMENTS

| | | |
|---|---|---|
| 2009/0154584 A1 | 6/2009 | Kishiyama et al. |
| 2016/0072614 A1 | 3/2016 | Blankenship et al. |
| 2016/0105803 A1 | 4/2016 | Sakhnini et al. |
| 2017/0201968 A1* | 7/2017 | Nam ............ H04W 4/70 |

(Continued)

OTHER PUBLICATIONS

PCT International Application No. PCT/KR2017/005855, International Search Report dated Sep. 8, 2017, 3 pages.

(Continued)

*Primary Examiner* — Rownak Islam
(74) *Attorney, Agent, or Firm* — Lee Hong Degerman Kang Waimey

(57) ABSTRACT

A method and apparatus for operating in a new radio access technology (NR) carrier in a wireless communication system is provided. A user equipment (UE) receives an indication of a system bandwidth and a center frequency of the system bandwidth from a network, and operates subbands in the NR carrier according to the indication. The center frequency of the system bandwidth corresponds to a direct current (DC) subcarrier.

8 Claims, 18 Drawing Sheets

(56) References Cited

U.S. PATENT DOCUMENTS

2017/0347350 A1* 11/2017 Takeda .................. H04W 72/04
2018/0227155 A1* 8/2018 Khoryaev ........... H04L 27/2602
2018/0255523 A1* 9/2018 Liu ....................... H04L 5/0092
2018/0270031 A1* 9/2018 Xia ....................... H04W 16/14
2018/0332603 A1* 11/2018 Takeda .................... H04J 11/00
2019/0116592 A1* 4/2019 Moon ............... H04W 72/0453

OTHER PUBLICATIONS

LG Electronics et al., "WF on Supporting different Numerologies in a NR carrier", 3GPP TSG RAN WG1 Meeting #85, R1-165806, May 2016, 5 pages.

ETRI, "Discussion on numerology for NR", 3GPP TSG RAN WG1 Meeting #85, R1-164870, May 2016, 7 pages.

* cited by examiner

[Fig. 1]
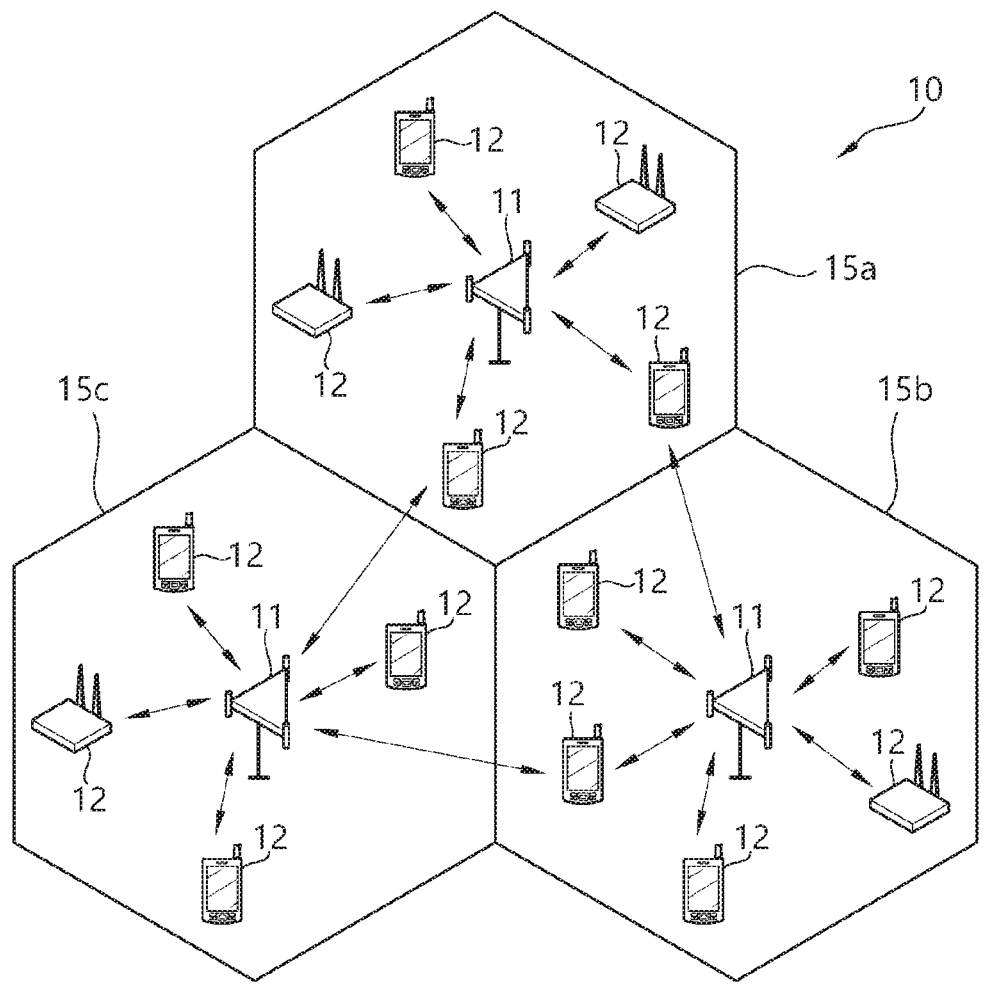
[Fig. 2]
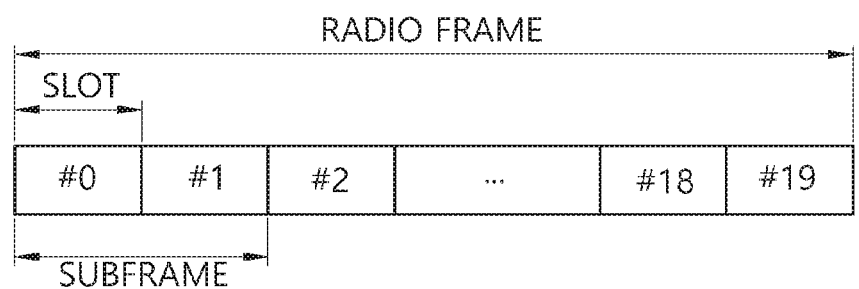

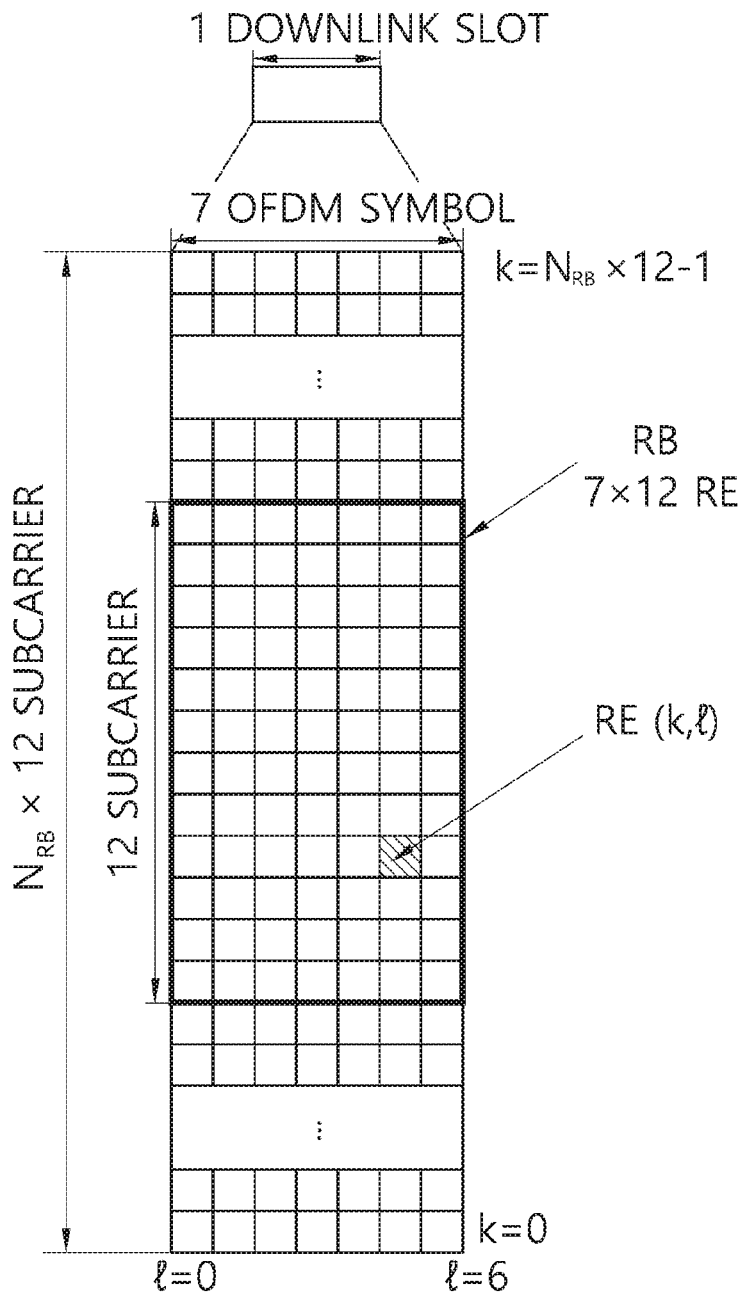
[Fig. 3]

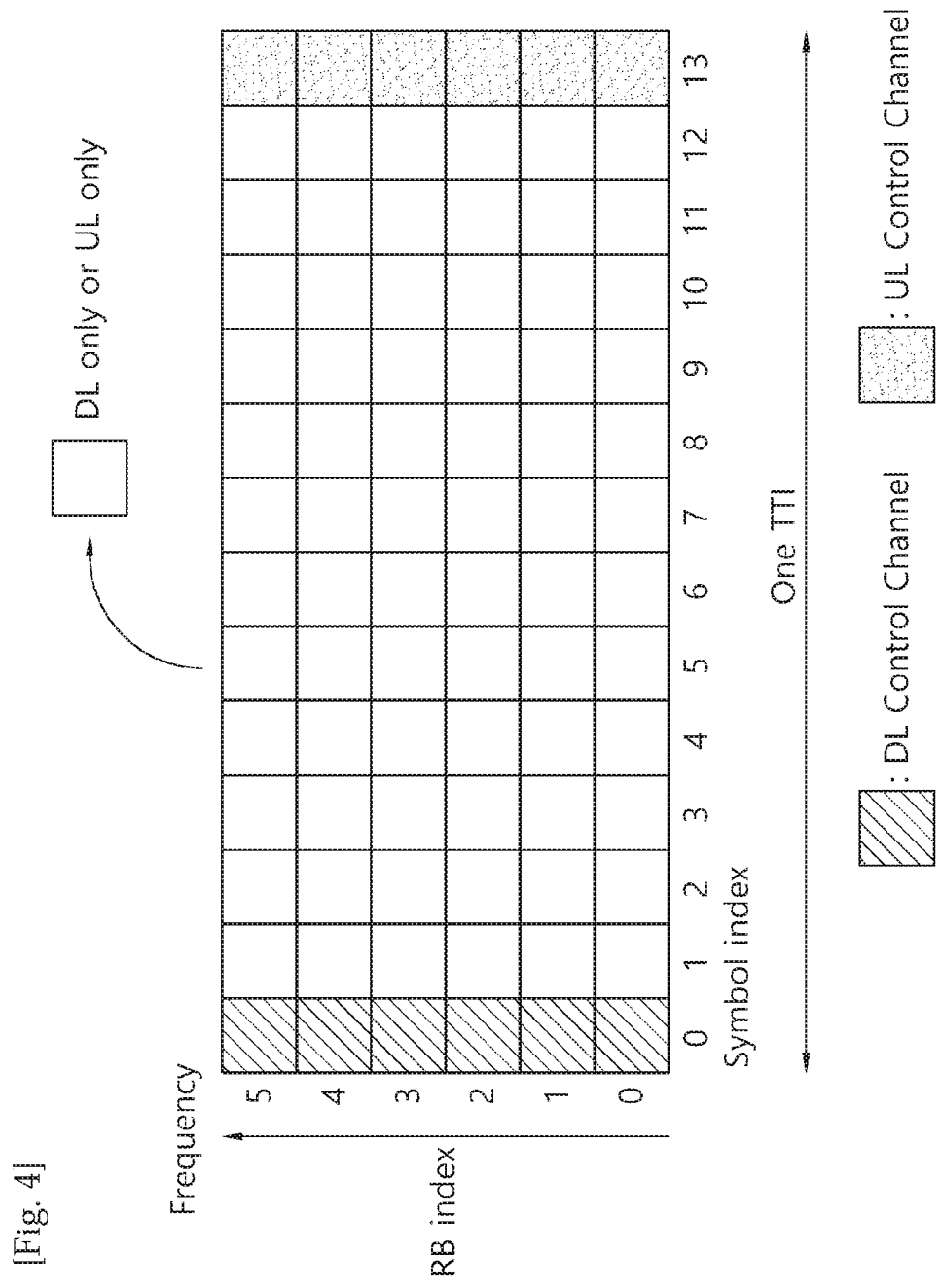
[Fig. 4]

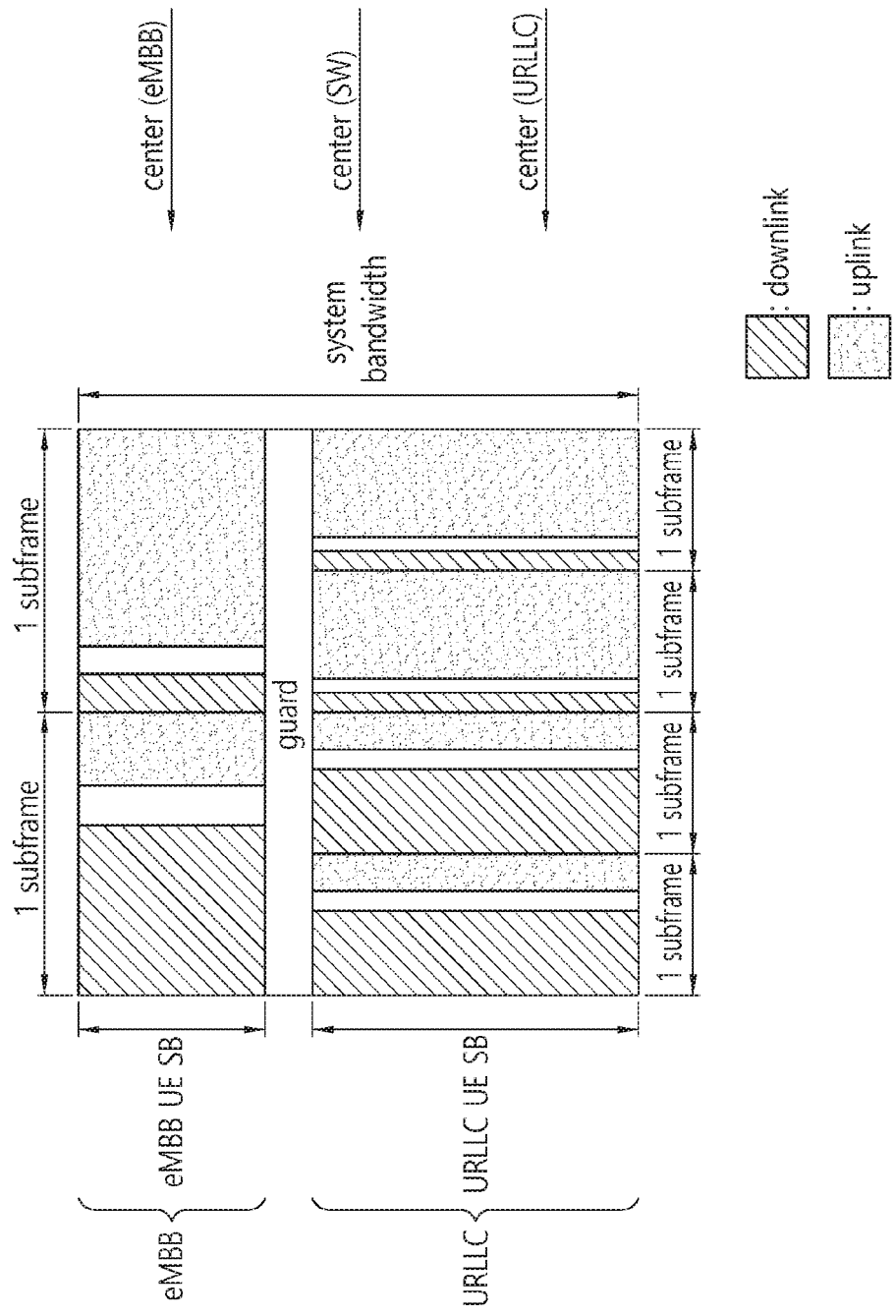
[Fig. 5]

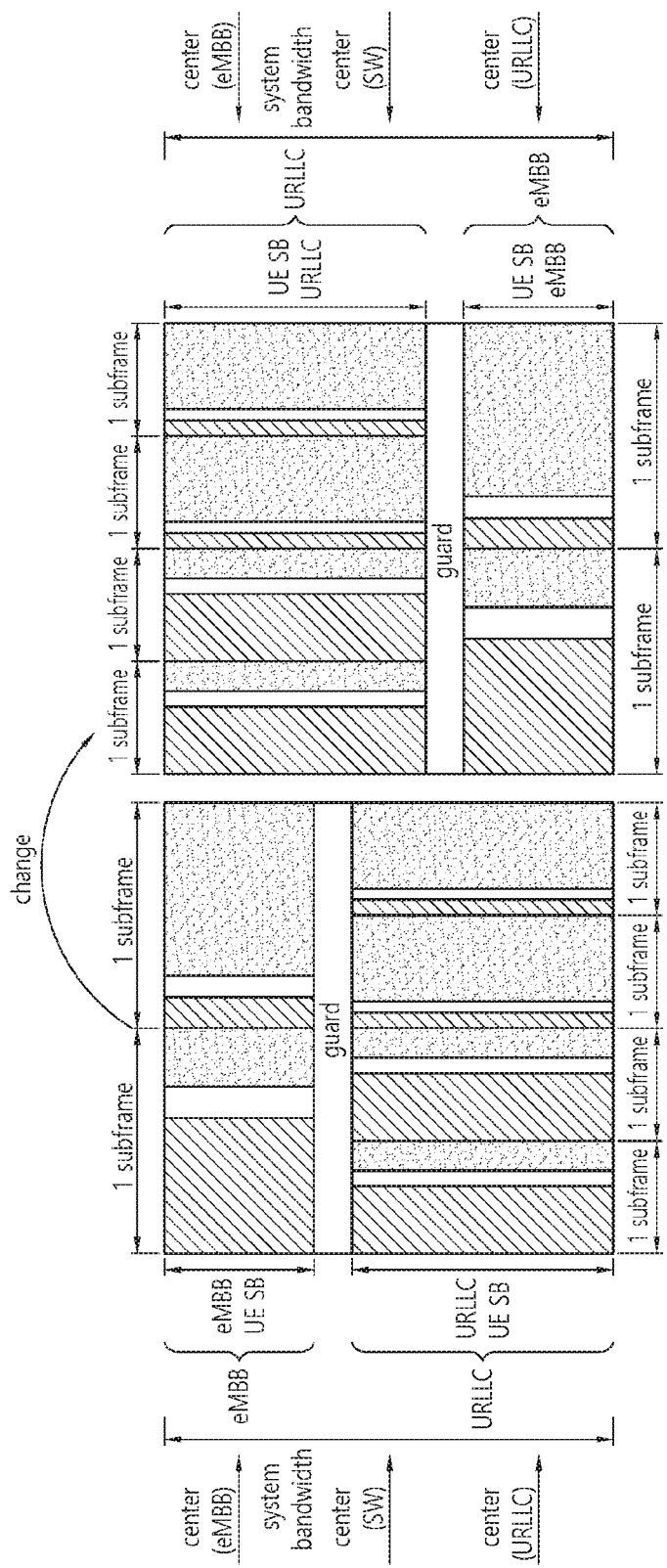
[Fig. 6]

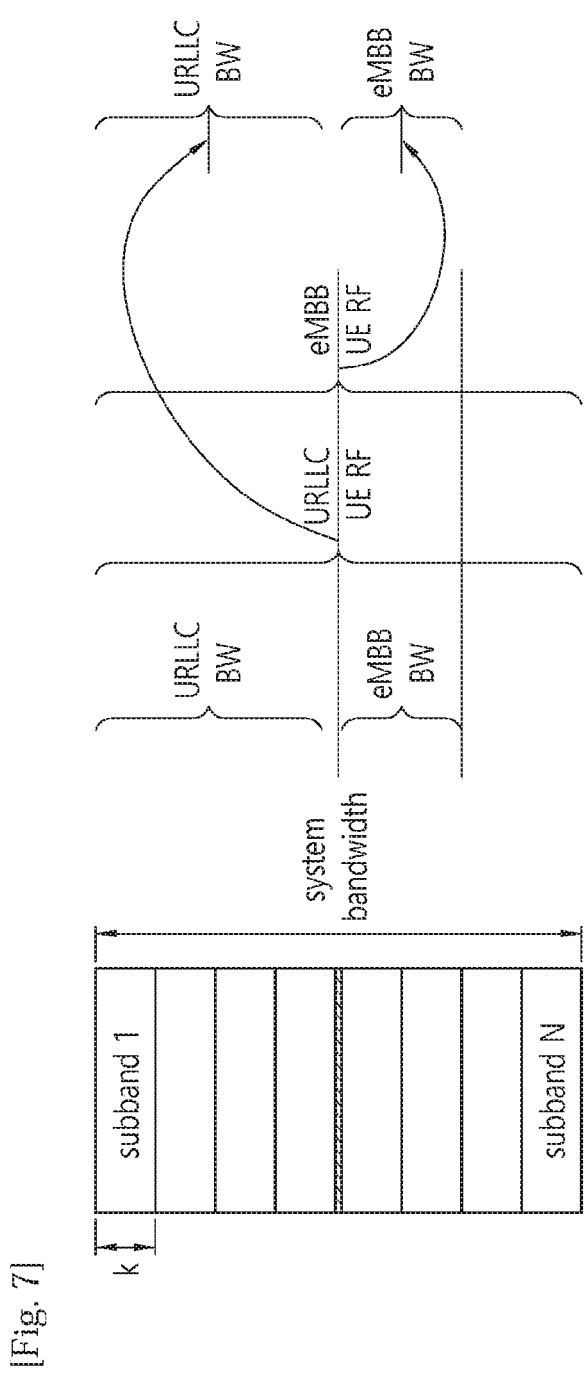
[Fig. 7]

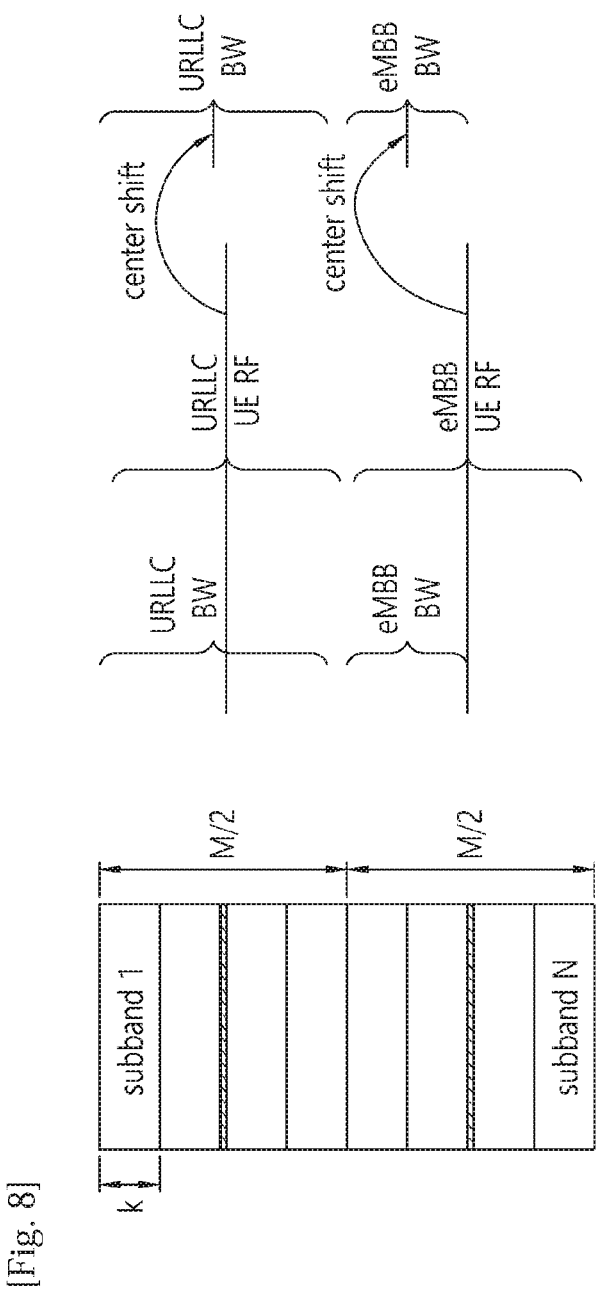

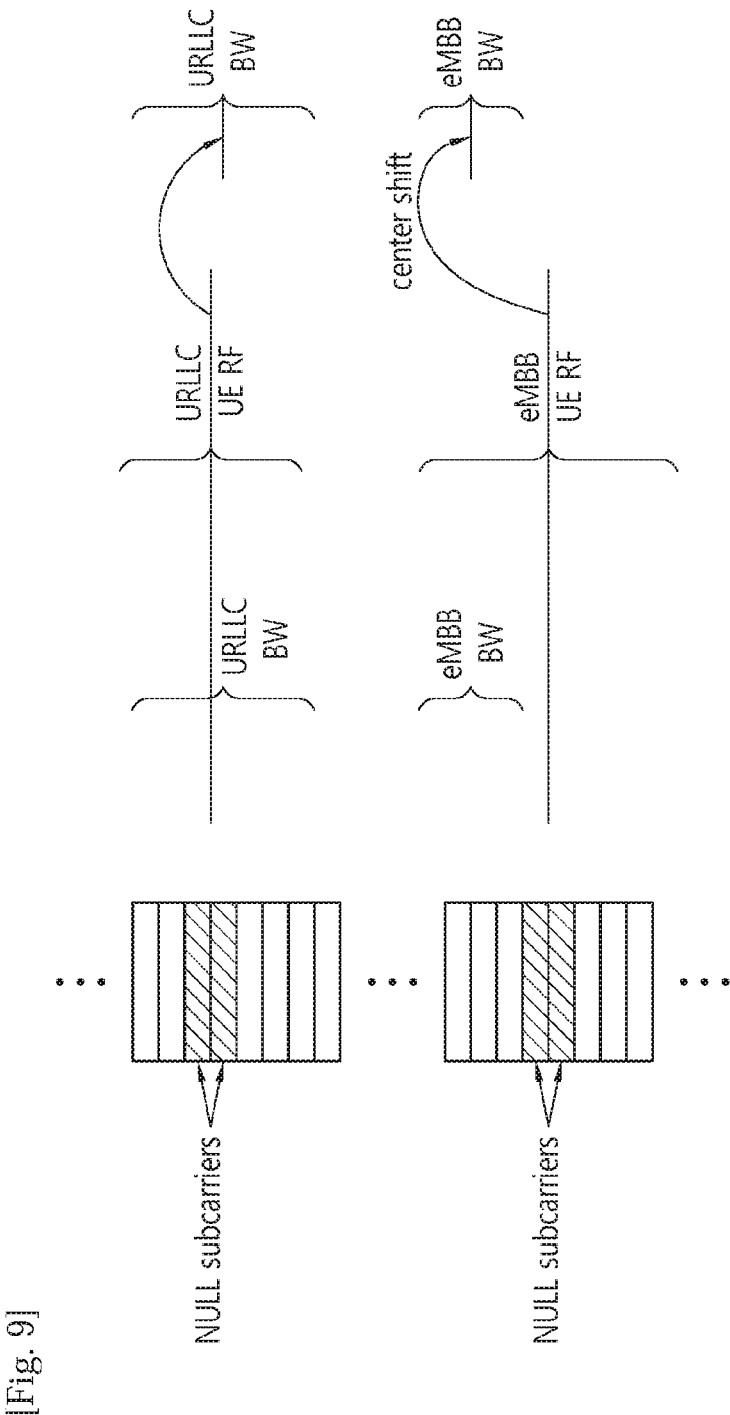
[Fig. 9]

[Fig. 10]
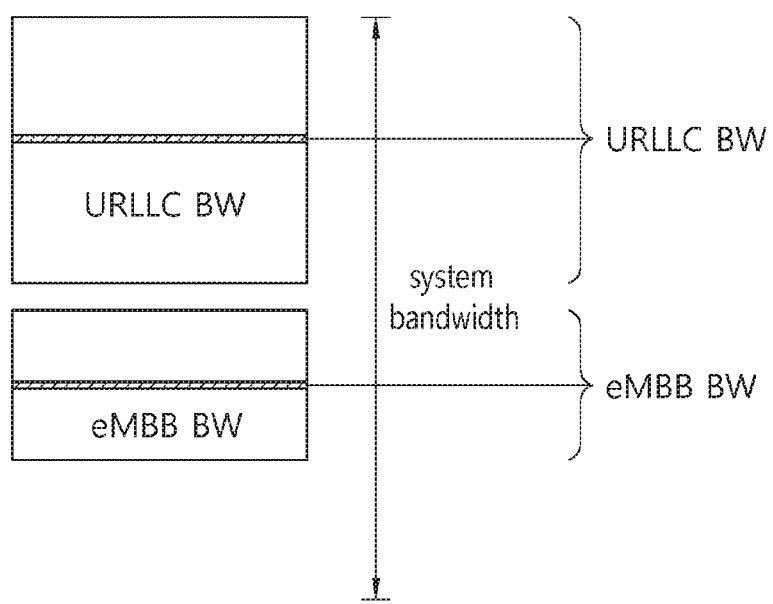

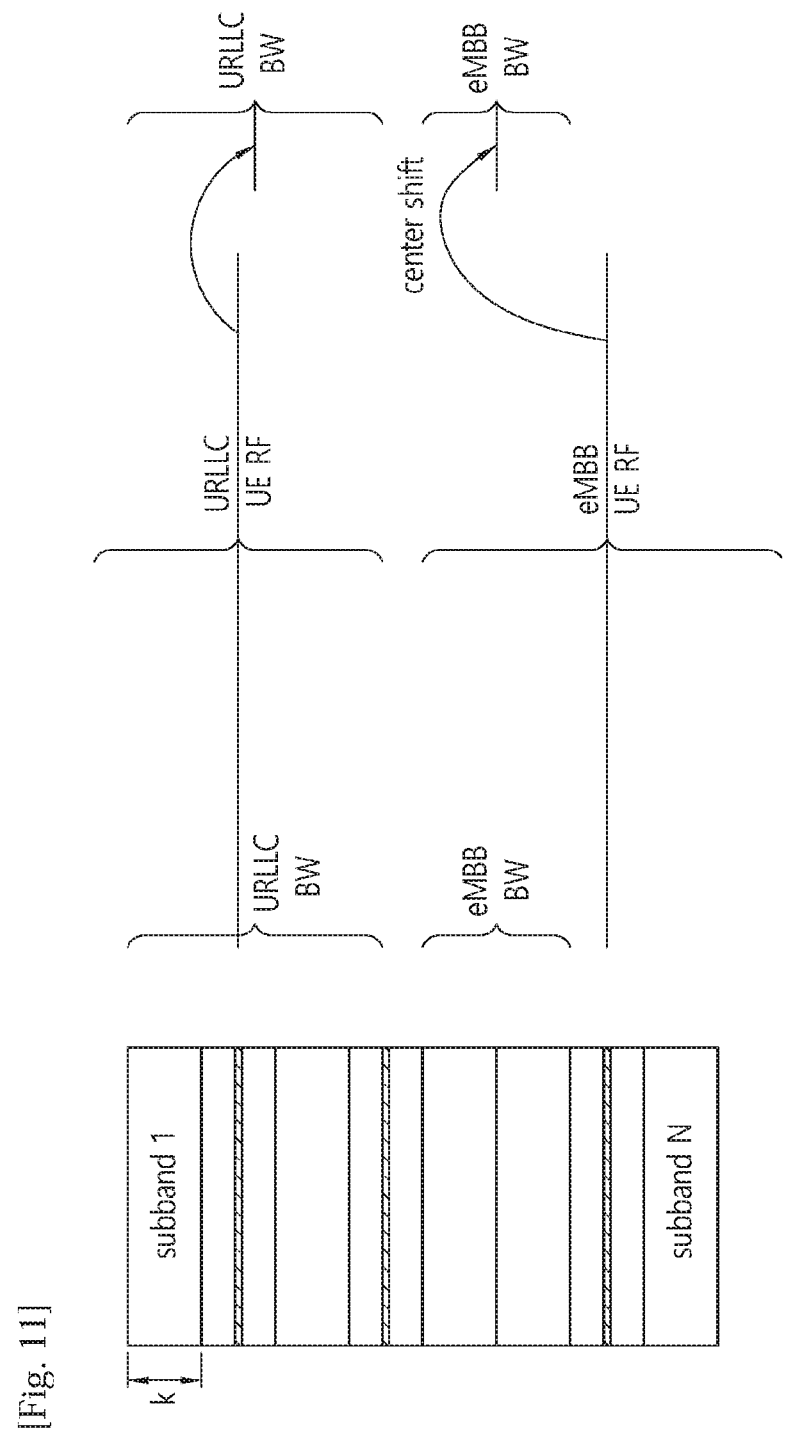

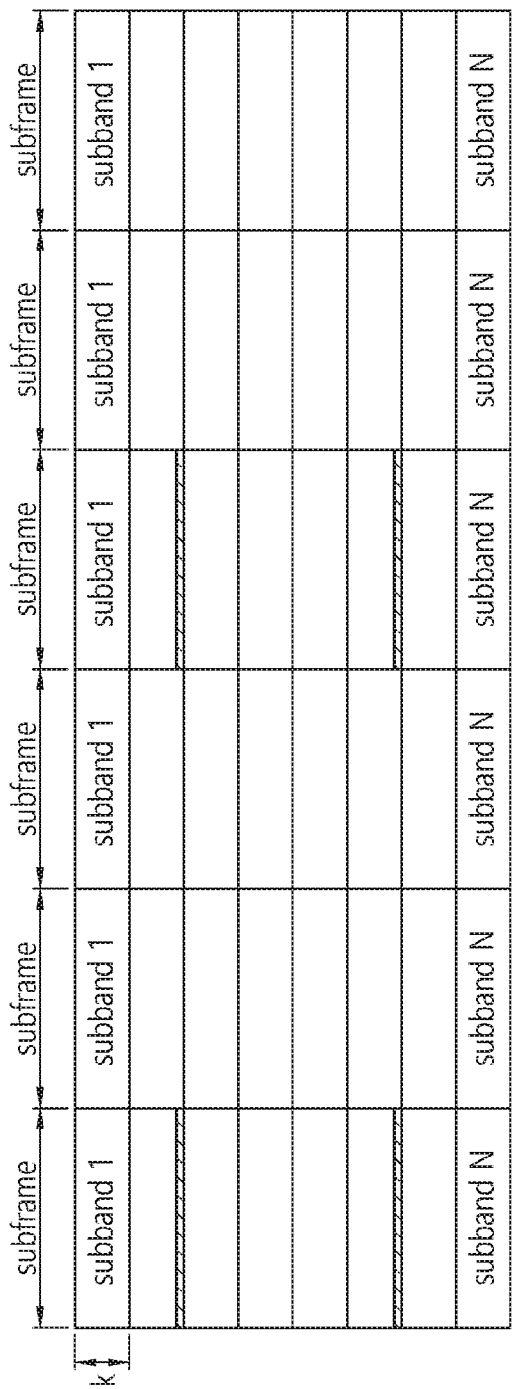

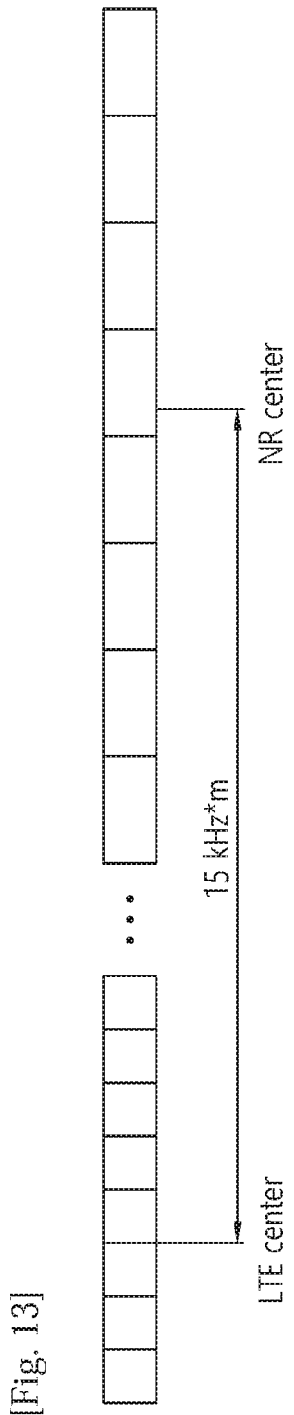
[Fig. 13]

[Fig. 14]
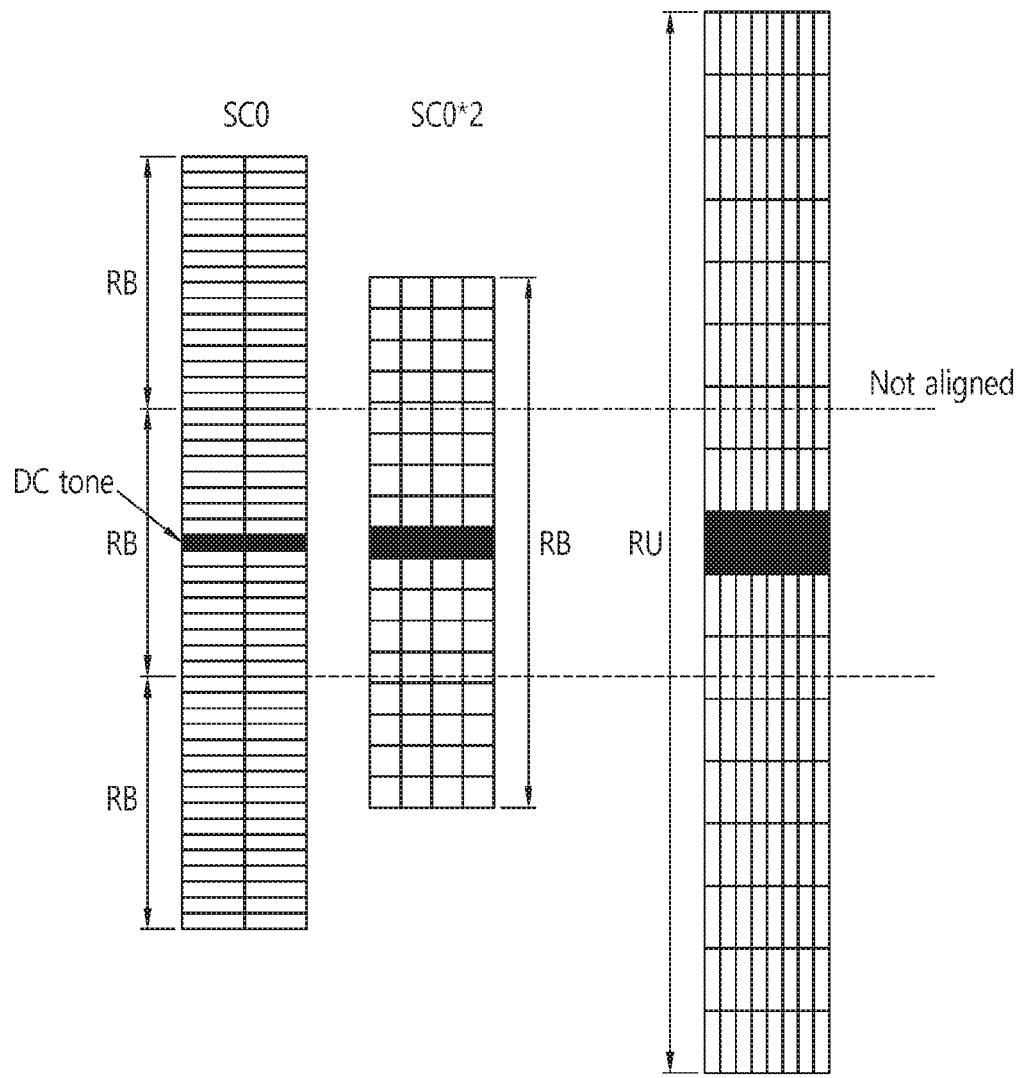

[Fig. 15]
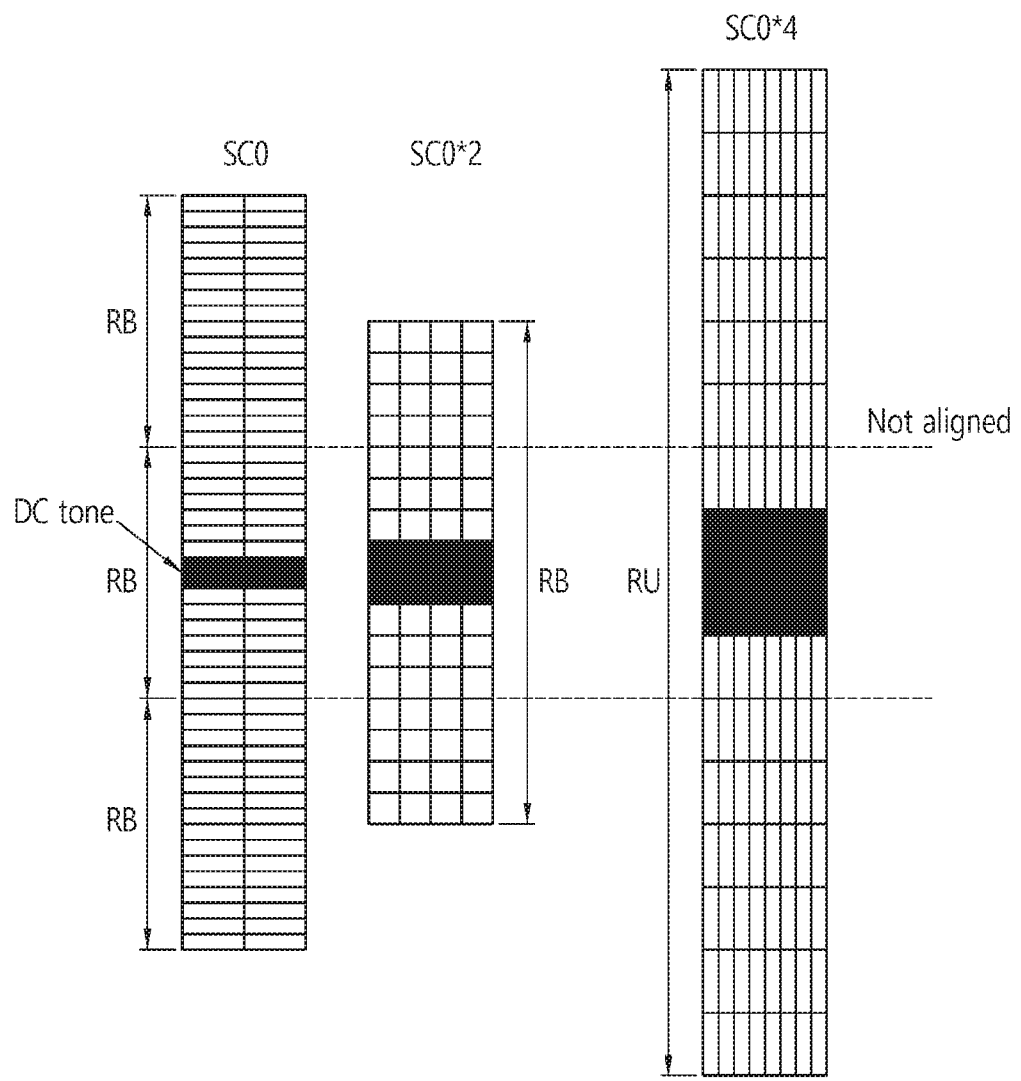

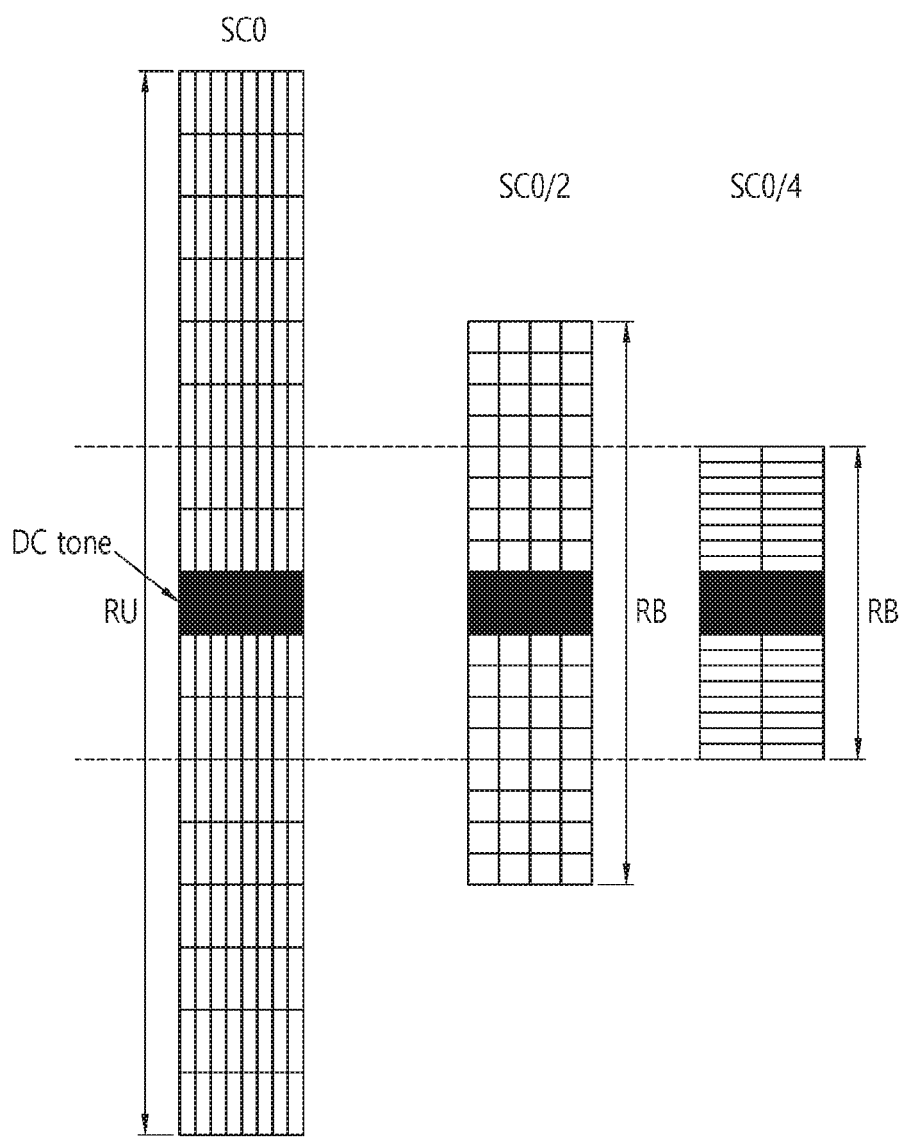
[Fig. 16]

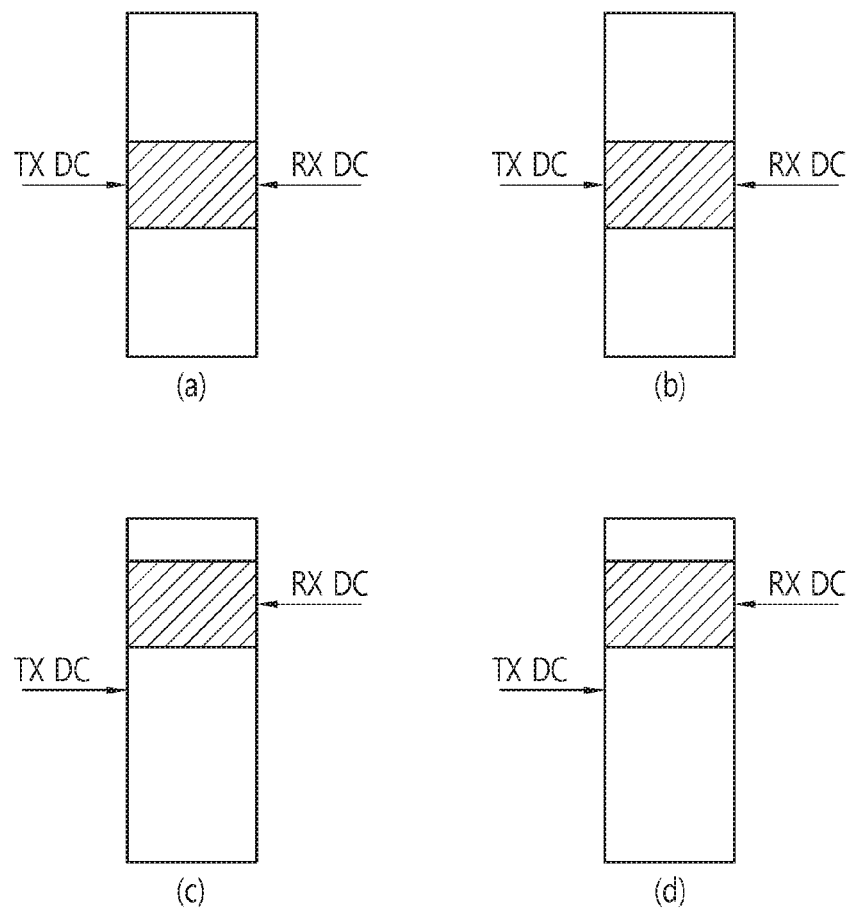
[Fig. 17]

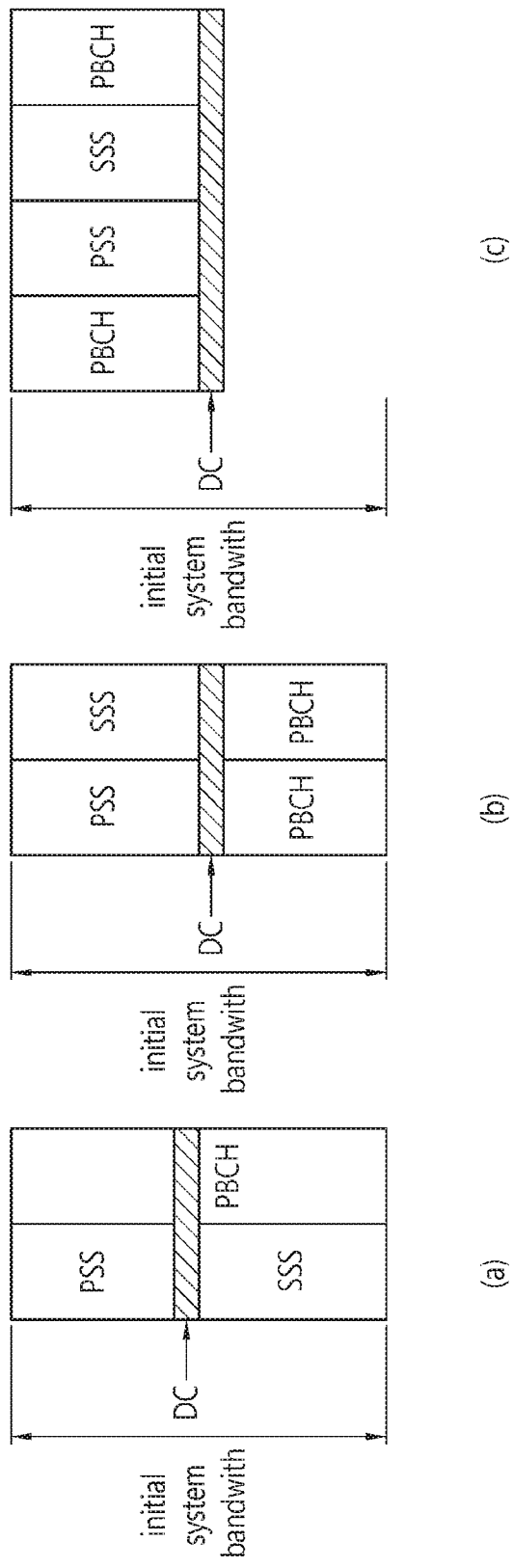
[Fig. 18]

[Fig. 19]
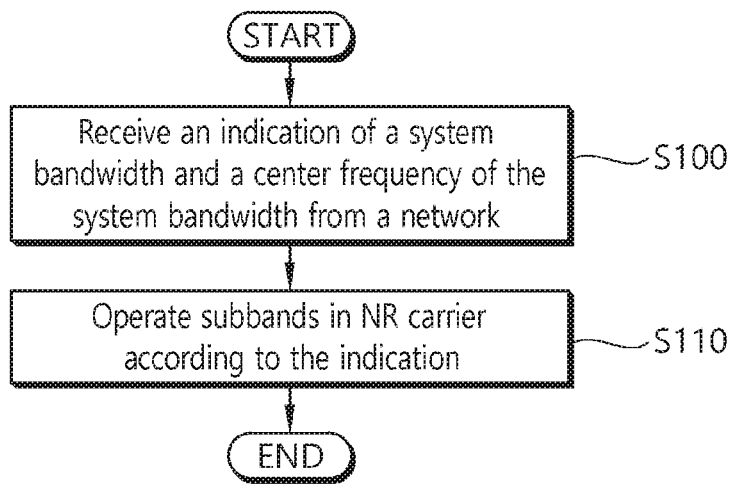
[Fig. 20]
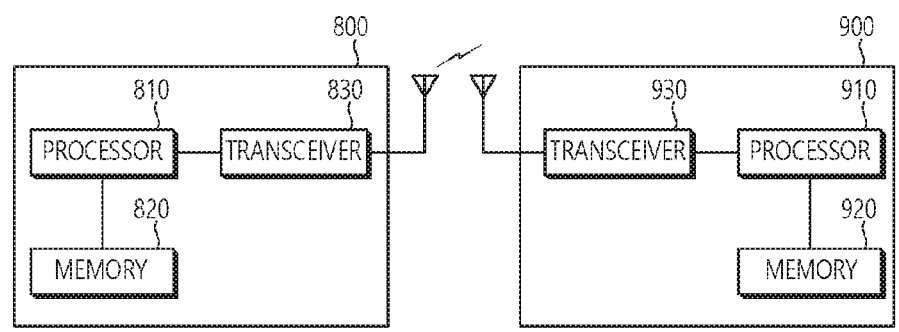

METHOD AND APPARATUS FOR HANDLING DC SUBCARRIER IN NR CARRIER IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No 62/339,094, filed on May 20, 2016, the contents of which are hereby incorporated by reference herein in its entirety. In addition, this application is a continuation of International Application PCT/KR2017/005855, with an international filing date of Jun. 5, 2017, currently pending, which claims the benefit of U.S. Provisional Application Nos. 62/367,113, filed on Jul. 27, 2016, 62/407,522, filed on Oct. 13, 2016, 62/420,532, filed on Nov. 10, 2016 and 62/476,628, filed on Mar. 24, 2017, the contents of which are all hereby incorporated by reference herein in their entirety.

BACKGROUND OF THE INVENTION

Field of the Invention

The present invention relates to wireless communications, and more particularly, to a method and apparatus for handling a direct current (DC) subcarrier in a new radio access technology (NR) carrier in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience. In NR, analog beamforming may be introduced. In case of millimeter wave (mmW), the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

For operating NR efficiently, various schemes have been discussed.

SUMMARY OF THE INVENTION

The present invention provides a method and apparatus for handling a direct current (DC) subcarrier in a new radio access technology (NR) carrier in a wireless communication system. The present invention discusses handling of DC subcarrier in a NR carrier in which different subband are potentially allocated to different user equipments (UEs).

In an aspect, a method for operating in a new radio access technology (NR) carrier by a user equipment (UE) in a wireless communication system is provided. The method includes receiving an indication of a system bandwidth and a center frequency of the system bandwidth from a network, and operating subbands in the NR carrier according to the indication. The center frequency of the system bandwidth corresponds to a direct current (DC) subcarrier.

In another aspect, a user equipment (UE) in a wireless communication system is provided. The UE includes a memory, a transceiver, and a processor, coupled to the memory and the transceiver, that controls the transceiver to receive an indication of a system bandwidth and a center frequency of the system bandwidth from a network, and operates subbands in a new radio access technology (NR) carrier according to the indication. The center frequency of the system bandwidth corresponds to a direct current (DC) subcarrier.

BRIEF DESCRIPTION OF THE DRAWINGS

FIG. 1 shows a wireless communication system.
FIG. 2 shows structure of a radio frame of 3GPP LTE.
FIG. 3 shows a resource grid for one downlink slot.
FIG. 4 shows an example of subframe type for NR.
FIG. 5 shows an example of different center frequencies based on usage according to an embodiment of the present invention.
FIG. 6 shows another example of different center frequencies based on usage according to an embodiment of the present invention.
FIG. 7 shows an example of DC subcarrier handling according to an embodiment of the present invention.
FIG. 8 shows another example of DC subcarrier handling according to an embodiment of the present invention.
FIG. 9 shows another example of DC subcarrier handling according to an embodiment of the present invention.
FIG. 10 shows another example of DC subcarrier handling according to an embodiment of the present invention.
FIG. 11 shows another example of DC subcarrier handling according to an embodiment of the present invention.

FIG. 12 shows another example of DC subcarrier handling according to an embodiment of the present invention.

FIG. 13 shows an example of handling coexistence of LTE and NR according to an embodiment of the present invention.

FIG. 14 shows an example of DC subcarrier handling for different numerologies according to an embodiment of the present invention.

FIG. 15 shows another example of DC subcarrier handling for different numerologies according to an embodiment of the present invention.

FIG. 16 shows another example of DC subcarrier handling for different numerologies according to an embodiment of the present invention.

FIG. 17 shows an example of cases for DC subcarrier handling in an initial access procedure.

FIG. 18 shows another example of DC subcarrier handling according to an embodiment of the present invention.

FIG. 19 shows a method for operating in a NR carrier by a UE according to an embodiment of the present invention.

FIG. 20 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes. In a TDD system, to allow fast switching between DL and UL, UL and DL transmission may be performed within a same subframe/slot in time division multiplexing (TDM)/frequency division multiplexing (FDM) manner.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 or 12×14 resource elements. The number NDL of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7 or 14, and in case of an extended CP, the number of OFDM symbols is 6 or 12. One of 128, 256, 512, 1024, 1536, 2048, 4096 and 8192 may be selectively used as the number of subcarriers in one OFDM symbol.

5th generation mobile networks or 5th generation wireless systems, abbreviated 5G, are the proposed next telecommunications standards beyond the current 4G LTE/international mobile telecommunications (IMT)-dvanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It is expected that different frame structure may be necessary for NR. Particularly, different frame structure in which UL and DL may be present in every subframe or may change very frequently in the same carrier may be necessary for NR. Different application may require different minimum size of DL or UL portions to support different latency and coverage requirements. For example, massive machine-type communication (mMTC) for high coverage case may require relatively long DL and UL portion so that one transmission can be successfully transmitted. Furthermore, due to different requirement on synchronization and tracking accuracy requirements, different subcarrier spacing and/or different CP length may be considered. In this sense, it is necessary to consider mechanisms to allow different frame structures coexisting in the same carrier and be operated by the same cell/eNB.

In NR, utilizing a subframe in which downlink and uplink are contained may be considered. This scheme may be applied for paired spectrum and unpaired spectrum. The paired spectrum means that one carrier consists of two carriers. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further, in NR, the following subframe types may be considered to support the paired spectrum and the unpaired spectrum mentioned above.

(1) Subframes including DL control and DL data
(2) Subframes including DL control, DL data, and UL control
(3) Subframes including DL control and UL data
(4) Subframes including DL control, UL data, and UL control
(5) Subframes including access signals or random access signals or other purposes.
(6) Subframes including both DL/UL and all UL signals.

However, the subframe types listed above are only exemplary, and other subframe types may also be considered.

FIG. 4 shows an example of subframe type for NR. The subframe shown in FIG. 4 may be used in TDD system of NR, in order to minimize latency of data transmission. Referring to FIG. 4, the subframe contains 14 symbols in one TTI, like the current subframe. However, the subframe includes DL control channel in the first symbol, and UL control channel in the last symbol. The remaining symbols may be used for DL data transmission or for UL data transmission. According to this subframe structure, DL transmission and UL transmission may sequentially proceed in one subframe. Accordingly, DL data may be transmitted in the subframe, and UL acknowledgement/non-acknowledgement (ACK/NACK) may also be received in the subframe. In this manner, the subframe shown in FIG. 4 may be referred to as self-contained subframe. As a result, it may take less time to retransmit data when a data transmission error occurs, thereby minimizing the latency of final data transmission. In the self-contained subframe structure, a time gap may be required for the transition process from the transmission mode to the reception mode or from the reception mode to the transmission mode. For this purpose, some OFDM symbols at the time of switching from DL to UL in the subframe structure may be set to the guard period (GP).

In 3GPP LTE, to minimize distortion from center frequency, null DC subcarrier has been used in the center frequency. The null DC subcarrier has not been counted in resource block definition in 3GPP LTE. However in NR, to allow different multiplexing among different services, it is unclear whether the center frequency of system bandwidth is always known to UE or all UEs can share the same center frequency. Accordingly, in NR, handling of DC subcarrier needs to be clarified with potentially different approaches from legacy system in which explicit carrier bandwidth is defined and each carrier may have center null DC subcarrier.

Hereinafter, a method for handling DC subcarrier in NR carrier according to embodiments of the present invention is described.

In NR, the following two aspects may be considered.
(1) From network perspective
Various frequency division multiplexing (FDM among different numerology/usage scenarios may be possible. This may lead dynamic bandwidth change from a usage or numerology perspective.
To support simultaneous UL and DL transmission within a carrier considering interference to adjacent carrier, particularly adjacent LTE carrier, dynamic change of UL and DL transmission bandwidth/location may be expected where null DC subcarrier(s) may not always be feasible (e.g. the same subcarrier/frequency may be used by another UE for UL transmission)

System bandwidth may be larger than system bandwidth that a UE can support. In other words, there may be different UE capabilities coexisting which requires different handling of center frequency or handling of different bandwidth supported by UEs.

(2) From UE perspective

Depending on usage scenarios, it may have different capability in terms of radio frequency (RF) bandwidth (and baseband processing).

Even with the same usage scenarios, depending on the needed maximum peak data rate, different RF bandwidth (and baseband processing) may be considered.

If a UE supports multiple usage scenarios, it may need to support multiple intra-carrier/band subbands whose center frequency needs to be clarified.

FIG. 5 shows an example of different center frequencies based on usage according to an embodiment of the present invention. Referring to FIG. the network utilizes FDM between enhanced mobile broadband (eMBB) UEs and ultra-reliable low latency communication (URLLC) UEs. In this case, eMBB UE and URLLC UE may see different center frequency which is different from center frequency of system bandwidth.

In this example, if initial access procedure is performed independently, the system bandwidth of each narrowband where each service is provided may be obtained. From a UE perspective which supports both eMBB and URLLC, two different carriers may be aggregated instead of one system bandwidth.

FIG. 6 shows another example of different center frequencies based on usage according to an embodiment of the present invention. FIG. 6 shows that subband configuration for eMBB UEs and URLLC UEs is changed per subframe, from FIG. 5. That is, dynamic frequency location change of subband operation may be performed.

1. Multiplexing Different Numerologies in a Single Carrier

As mentioned above, multiplexing between eMBB and URLLC in the single carrier with different subband is possible from a UE perspective. In this case, depending on the population of each service, the bandwidth used for eMBB and URLLC may be different from each other. eMBB may utilize the entire system bandwidth and eMBB UEs may assume that the configured carrier bandwidth is always used for eMBB unless the resources are configured for blank or reserved. URLLC or mMTC can utilize the partial system bandwidth with the same numerology without affecting eMBB operation. Alternatively, URLLC or mMTC may utilize the partial or full system bandwidth with different numerology. In this case, bandwidth between URLLC or mMTC and eMBB may be fully or partially overlapped. Or, URLLC or mMTC and eMBB may be multiplexed by FDM.

For the change of partially overlapped bandwidth or multiplexed bandwidth by FDM, Semi-static configuration or dynamic configuration may be used. If dynamic configuration is used, for eMBB/URLLC control transmission, the bandwidth may be either semi-statically configured (regardless of actual bandwidth of each usage scenario or subband of data transmission). Or, previous subframe or previously available subframe may indicate the subband duration of control channel of the next subframe. For data portion, this may be indicated by the control channel or semi-statically configurable. If a UE does not need to know the actual subband bandwidth where the same numerology needs to be used, signaling may not be necessary, and dynamic bandwidth adaptation may be done via scheduling.

2. DC Subcarrier Handling

For flexible and dynamic subband operation in NR carrier, some options may be considered as follow to handle null DC subcarrier(s).

(1) It may be assumed that a UE always can support system bandwidth or a maximum bandwidth (one carrier's or one component carrier's system bandwidth with multiple usage scenarios multiplexed may be equal to or less than the maximum bandwidth supported by the UE). In this case, system bandwidth and center frequency of the system bandwidth may be indicated to the UE regardless of subband location where a UE is serviced. This may also be applied to the case where a UE may not support the system bandwidth from the capability perspective. In the example, center frequency of system bandwidth may be indicated to both eMBB/URLCC UEs and it may be assumed that center subcarrier of the system bandwidth/carrier is a null DC subcarrier. Even if the center frequency carries data, knowing the location of DC may be used by UE to mitigate the impact from DC subcarrier. This is shown from DL perspective. If a small bandwidth supporting UEs cannot support the system bandwidth, additional null DC subcarrier may not be used.

FIG. 7 shows an example of DC subcarrier handling according to an embodiment of the present invention. Referring to FIG. 7, system bandwidth and center frequency of the system bandwidth is indicated to the UE, and subband operations based on usage may be performed according to the indication.

If this approach is used, similar assumption may be used for UL or sidelink (SL) or relay link (UL/DL) operation. That is, similar to DL, null DC subcarrier(s) may be used for UL or SL or relay link. Alternatively, different from DL, no null DC subcarrier(s) may be used for UL or SL. This may give half-subcarrier shift operation around center frequency. For relay operation, if DL link is used, same assumption or same handling to DL may be used, and if UL is used, same assumption or same handling to UL may be used. Alternatively, if relay operation is performed towards a UE, similar operation to DL may be used, and if relay operation is performed towards an eNB, similar operation to UL may be used. In other words, for relay link, same handling as either DL or UL may be followed depending on the direction of relay.

If null DC subcarrier(s) is not counted for resource block or signal generation and if null DC subcarrier is used for UL, half-subcarrier shift may be assumed. If DC subcarrier(s) is counted for resource block or signal generation, the same signal generation to DL may be used regardless of presence of null DC subcarrier. Moreover, data may be carried over the DC subcarrier(s). If this option is used, instead of one null DC subcarrier(s) in center frequency (or ½ subcarrier spacing up or down around center frequency), two null DC subcarriers may be used with null transmission or data transmission.

(2) For UEs which are not very low complexity UEs, the minimum system bandwidth "M" that the UE can support with a numerology may be defined. The network may make it sure that at least one null DC subcarrier(s) may be placed within "M/2" bandwidth, and null DC subcarrier(s) may not be placed in the center of system bandwidth "M". However, as the UE can support system bandwidth "M", null DC subcarrier may be utilized for DC handling assuming that the subband bandwidth the UE needs to support is also less than "M/2". For example, if UEs support 20 MHz bandwidth as a minimum requirement, there may be at least one DC subcarrier within 10 MHz from center location of UE's subband and the maximum subband size may be 10 MHz. To support this, the network may configure multiple null DC subcarriers over the entire system bandwidth. Based on UE's carrier frequency to get service from, one or multiple null DC subcarriers may be utilized.

FIG. 8 shows another example of DC subcarrier handling according to an embodiment of the present invention. Referring to FIG. 8, at least one null DC subcarrier is placed within "M/2" bandwidth both for eMBB and URLLC respectively, and null DC subcarrier is not placed in the center of system bandwidth "M"

If this approach is used, similar assumption may be used for UL or SL or relay link (UL/DL) operation. That is, similar to DL, null DC subcarrier(s) may be used for UL or SL or relay link. In this case, locations may be changed for UL operation, which will be described below. Alternatively, different from DL, no null DC subcarrier(s) may be used for UL or SL. For relay operation, if DL link is used, same assumption or same handling to DL may be used, and if UL is used, same assumption or same handling to UL may be used. Alternatively, if relay operation is performed towards a UE, similar operation to DL may be used, and if relay operation is performed towards an eNB, similar operation to UL may be used.

With this option, null DC subcarrier(s) may be counted for resource block or signal generation, and thus, half-subcarrier shift signal processing may or may not be used. From UL perspective, if DL utilizes half-carrier shift, half-subcarrier shift may also be assumed around the center frequency. Difference is between that null DC subcarrier is used and that null DC subcarrier is not used may be whether NULL transmission in some subcarrier is used or not.

FIG. 9 shows another example of DC subcarrier handling according to an embodiment of the present invention. Referring to FIG. 9, if half-subcarrier shifting is used and null transmission is used in some subcarrier(s), two subcarriers may be used with NULL transmission, and a UE may tune to the center of two subcarriers.

(3) Assuming that subband is semi-statically configured and may not change so dynamically, null DC subcarrier(s) per subband operation may also be considered.

FIG. 10 shows another example of DC subcarrier handling according to an embodiment of the present invention. Referring to FIG. 10, if the subband location changes, the center position may also change.

This option may be similar to option that system bandwidth and center frequency of the system bandwidth may be indicated to the UE regardless of subband location where a UE is serviced, assuming that system bandwidth is the same as subband bandwidth from each UE or usage subband perspective. If this approach is used, similar assumption may be used for UL or SL or relay link (UL/DL) operation. That is, similar to DL, null DC subcarrier(s) may be used for UL or SL or relay link. In this case, locations may be changed for UL operation, which will be described below. Alternatively, different from DL, no null DC subcarrier(s) may be used for UL or SL. For relay operation, if DL link is used, same assumption or same handling to DL may be used, and if UL is used, same assumption or same handling to UL may be used. Alternatively, if relay operation is performed towards a UE, similar operation to DL may be used, and if relay operation is performed towards an eNB, similar operation to UL may be used.

If null DC subcarrier(s) is not counted for resource block or signal generation and thus half-subcarrier shift signal processing is not used, the signaling processing over multiple subbands should be managed (e.g. for UEs supporting multiple subbands simultaneously). For one option, only one null DC subcarrier(s) is not counted for resource block or signal processing, and others may be configured/implicitly determined by the network. From UL perspective, half-subcarrier shift may be used around the center frequency (which may be different per UE depending on its center) or a UE may be configured with UL center frequency (or implicitly determined from synchronization signal) to assume half-subcarrier shift at the system bandwidth's center.

(4) A list of subbands in which the network configures null DC subcarrier(s) (or the list of null or potential DC subcarriers) may be configured/broadcasted, and utilizing null DC subcarrier(s) may be up to UE implementation. If a UE may not utilize null DC subcarrier(s) due to e.g. limited bandwidth, null DC subcarrier(s) may not be used for its center frequency handling. All configured null DC subcarriers may be punctured or rate matched for control/data transmission. This may be used for all other options as well for the configured/known null DC subcarriers.

FIG. 11 shows another example of DC subcarrier handling according to an embodiment of the present invention. Referring to FIG. 11, a list of subbands in which the network configures null DC subcarrier(s) is configured, and utilizing null DC subcarrier(s) is up to UE implementation.

The null DC subcarrier mentioned in the present application may be replaced by virtual center DC subcarrier. The virtual center DC subcarrier may be modulated (i.e. DC subcarrier is used for data transmission). In other words, configuration of multiple null DC subcarriers may be understood as configuration of multiple virtual center DC subcarriers, and transmitter and/or receiver may assume that actual DC subcarrier may occur in one of those virtual center DC subcarriers.

Meanwhile, if eMBB RF bandwidth does not support sufficiently large to utilize one of configured DC subcarrier, it may get performance degradation. If multiple null DC subcarrier(s) are present in the system (either by approach (2) or (4) described above, but may not be restricted to the above two approaches), after introducing multiple null DC subcarriers at known positions, the multiple null DC subcarriers may be reused for multiple purposes simultaneously. The other DC subcarriers not selected by the UE receiver for the RX center frequency may be used for background interference estimation, etc. In other words, instead of purpose of only DC handling, the network may configure multiple blank subcarriers for multiple purposes, and one of them may be to support DC handling. Other purpose may include interference estimation among neighbor cells, among UEs, between access link and relay link, etc. To enable this, the location of null DC subcarrier(s) may be different. The location of DC subcarrier(s) may be higher layer configured. The location of DC subcarrier(s) may be predefined based on cell ID and/or system frame number (SFN) information.

For initial access for synchronization signal acquisition or the procedure before this information is available, a UE may assume that null DC subcarrier is not present during the signals/channels transmission which are transmitted before null DC subcarrier(s) information is known to UEs. Alternatively, the UE may assume that null DC subcarrier(s) is always present in the center of synchronization signal(s), and not present for other channel transmission until null DC subcarrier(s) information is known to UEs. Alternatively, the UE may assume that null DC subcarrier(s) is always present in the center of synchronization signals, and the same subcarrier (in terms of frequency location) is used for other channel transmission until null DC subcarrier(s) information is known to UEs.

When null DC subcarrier(s) can be used for interference measurement, when a UE reports feedback, the UE may also report which subcarrier is used for interference measurement, as multiple cells may use different set of blank subcarrier(s). Unless explicitly indicated which blank subcarrier(s) can be averaged from interference measurement perspective, a UE may perform individual measurement on each blank subcarrier. As there may be multiple blank subcarrier(s), the measurement may be performed based on request, instead of periodic/semi-static operation. In terms of request on interference measurement report, a network or a UE may request explicit blank subcarrier index or other index to derive the index for blank subcarrier resource for measurement.

(5) Null DC subcarriers may be present not all subframes. Rather, DC subcarriers may be placed every 'N' subframes (based on default numerology assumed for this operation). Or, DC subcarriers may be placed only in subframes used for cell common data/control transmissions. The periodicity may also be configured. The periodicity may be differently configured per different subband which may also be different per numerology and/or usage scenarios.

FIG. 12 shows another example of DC subcarrier handling according to an embodiment of the present invention. Referring to FIG. 12, DC subcarriers are placed only in every 4 subframes, not in every subframe.

Instead of null DC subcarrier(s), a known signal may be transmitted in such configured null DC subcarriers. The known signal may also be also used for pilot as well as handling of DC. For example, known sequence or repetitions of a constant value of symbol may be transmitted with a reference subcarrier spacing and CP length, which is used for initial access or indicated by the network to be used for handling DC issue or in the DC subcarrier transmissions. Instead of blank subcarrier, if the known sequence is used, the fixed constellation point in other tones (except the subcarrier used for DC handling from a UE perspective) may be used for other estimations or references (signal power measurement or measurement on wide-beam or measurement on narrow beams (wide-beam channel quality indicator (CQI)–average over multiple narrow beam)). From a UE receiver perspective, based on the constantly received known signal over the subcarrier, DC offset may be estimated by cancelling the known signal.

Null DC subcarrier(s) may not be counted for any resource block definition, and thus it will not impact any reference signal (RS) mapping or control/data mapping. In terms of synchronization channel transmitted across null DC subcarriers, the DC subcarrier may be rate matched or punctured or not counted for signal mapping from the beginning. This option may be more appropriate for approach (1) or (3) described above, but may be applied to other approaches as well.

Alternatively, null DC subcarrier(s) which is counted for resource block definition may be puncture or not be used, but signal/channels may not be mapped over null DC subcarrier(s) in a subframe. If RS needs to be mapped to null DC subcarrier, it may be shifted by one or a few subcarriers in frequency domain (i.e. transmitted in other subcarrier). Or, the RS transmission may be punctured, which may degrade the performance. In terms of control/data mapping, either rate matching or puncturing may be used. More specifically, whether the null DC subcarrier is counted for resource block or not may be separately configured per subband, if multiple subcarrier(s) may be configured. Alternatively, depending on subband type (e.g. LTE compatible, LTE non-compatible) where null DC subcarrier is used, whether to count the DC subcarrier for resource block may be defined. For example, in case of LTE compatible, then null DC subcarrier may not be counted for resource block, and in case of other types, null DC subcarrier may be counted for resource block.

Particularly, for multimedia broadcast multicast services (MBMS) service, null DC subcarrier(s) may not be used, as it may be a cell-specific configuration rather than cell-common among neighbor cells. Alternatively, for MBMS service, different null DC subcarrier(s) may be configured to support MBMS stand-alone operation. Similarly among different numerology/usage scenario, independent configuration may be feasible.

The techniques mentioned in the present application may be applied to the case where the transmitter also transmits data in the configured DC subcarriers. More specifically, the transmitter may indicate the center frequency or DC subcarrier or the presence of DC subcarrier in the bandwidth that the receiver is monitoring. When the center frequency of the transmitter is known, the receiver may use the information for better estimation of DC subcarrier offset. In terms of indication of center frequency or DC subcarrier, the following approaches may be considered for the transmission from the network.

- The center frequency may be the center of the system bandwidth and system bandwidth may be indicated to UEs. The system bandwidth may be different to UE monitoring bandwidth.
- Explicit center frequency or DC subcarrier may be indicated.
- Possible DC subcarriers may be indicated.
- The presence of DC subcarrier in the monitored bandwidth by a UE may be indicated.

Regardless of null DC subcarrier (assuming that any subcarrier is counted for resource block) from the signal generation perspective for DL transmission or relay link, half subcarrier may be shifted on a reference subcarrier or frequency. If reference subcarrier or frequency is not given, either center frequency or one of the mechanism mentioned in above may be considered. If a reference subcarrier or frequency is given beyond the system bandwidth of downlink or relay link transmission (e.g. if DL or relay link bandwidth is 10 MHz from f0 to f1, and the reference frequency is given as 'f0-delta'), then half subcarrier shift may be performed at the reference point and thus all subcarriers may be represented as positively half subcarrier shifted in the signal generation. In other words, center frequency from the signal generation perspective may be placed outside of transmission bandwidth. In other words, DC subcarrier may be placed outside of the transmission bandwidth, and DC subcarrier may be half-subcarrier shifted.

The techniques proposed in the present invention may also be applied in case that data is carried over DC subcarrier(s). Further, DC subcarrier may include actual DC subcarrier of the transmitter regardless of whether null transmission or data are carried in the DC subcarrier.

More clearly, if, null DC subcarrier is not used though DC subcarrier(s) may be created by puncturing or rate matching, the following options may be considered. Even when data is mapped on DC subcarrier(s) (i.e. no explicit null DC subcarrier is used), the following options may be applied:

- In a subframe which is assumed to be DL subframe (cell-specific or UE-specific), a UE may assume that DC subcarriers are not used for data transmission, but may be used for RS transmission (thus only partial parts may be transmitted with DC subcarriers). RS may also be rate matched if the subframe schedules any data to the specific UE which assumes the subframe as only subframe with containing DC subcarriers.

Regardless of UE scheduling, a set of subframes/slots may contain DC subcarriers which are not used for any data mapping. DC subcarriers may be still used for RS or channel state information RS (CSI-RS) transmission. Thus, only partial slot may contain area of DC subcarriers. The set of subframes may be semi-statically configured DL subframes.

Periodicity may be long with a few subframes/slots used for DC subcarrier purpose, and other subframes/slots may not be used for DC subcarrier purpose. In other words, only a few subframes/slots may be used with rate matching/puncturing on data transmission for DC subcarrier(s), and other subframes/slots may transmit data over the available resource blocks without special handling for DC subcarrier(s). The set of subframes used for DC subcarrier purpose may be determined by e.g. any subframe/slot with radio resource management (RRM) RS transmission and/or system information broadcast and/or synchronization signal transmission, In terms of DC subcarrier location in frequency if rate matching or puncturing on data is used, as proposed in this invention, it may be placed in the center of a carrier or in any prefixed location, or per subband, etc.

3. Coexistence with LTE

If one eNB operates both LTE and NR, from a LTE UE perspective, center frequency of LTE subband may be used for LTE center frequency. For NR UEs, if the system bandwidth is small, the same center frequency (used for LTE) may be indicated as one of null DC subcarrier(s) to NR UEs such that NR UEs can utilize LTE's center DC subcarrier for DC handling. More specifically, if the transmitter supports both LTE and NR signal generation by the same RF, DC subcarrier indication may be done outside of system bandwidth. For example, DC subcarrier frequency of the entire LTE+NR carrier frequency may be indicated for DC subcarrier.

When UL is shared between LTE and NR, the following cases may be considered.

(1) Single RF is used for LTE and NR multiplexed by FDM (intra-contiguous carrier aggregation (CA) between LTE and NR carriers)

(2) Single RF is used for LTE and NR multiplexed by FDM, where NR frequency is nested within LTE frequency: This scenario may include intra-band CA between NR and NR carriers.

(3) Single RF is used for LTE and NR multiplexed by TDM (same or different bandwidth between LTE and NR may be assumed): This scenario may include intra-band CA between NR and NR carriers.

(4) Multiple RF is used for NR and LTE respectively: This scenario may include intra-band CA between NR and NR carriers.

For each case, to make effective UL transmission corresponding to UE RF capability, some considerations may be necessary. When single RF is used, it may be necessary to align waveform between NR and LTE carriers. Numerology between LTE and NR carriers may be different from each other. However, not to impact on LTE signal, 7.5 kHz may be shifted on the center assuming center of the RF. This may imply that center between NR and LTE UL carrier is multiple of 15 kHz regardless of numerology used in NR, and NR UL signal is also 7.5 kHz shifted from NR carrier perspective regardless of numerology used for NR.

FIG. 13 shows an example of handling coexistence of LTE and NR according to an embodiment of the present invention. Referring to FIG. 13, center or DC subcarrier of NR carrier is 7.5 kHz shifted. Furthermore, the gap between LTE center and NR center may not be multiple of 15 kHz depending on channel raster. To address this issue, UL carrier center frequency or channel raster may be multiple of 15 kHz or the shifted value of NR center with accommodation of difference may be considered.

The similar issue may be applied to case (2). However, for case (2), the center between LTE and NR carriers needs to be aligned to avoid any unnecessary processing at the UE side. Similar to case (2), for case (3), center frequency between NR and LTE carriers may need to be aligned including half-subcarrier shift such that unnecessary frequency retuning may not occur.

4. Handling UL & SL DC Subcarrier

For UL transmission, regardless of SC-FDM or OFDM is used, it may not be necessary to include null DC subcarrier unless it is used for some other purpose such as interference measurement.

Generally, at least one of the following options may be considered for UL/SL/relay link operation.

(1) Same null DC subcarrier may be used for the transmission. To have consistent behavior between DL and UL, the same null DC subcarrier may be used for UL transmission. This option may particularly be applied to cases where null DC subcarrier(s) is not counted for resource block and/or in unpaired spectrum case.

(2) Regardless of null DC subcarrier in DL, UL may be transmitted without null DC subcarrier. If null DC subcarrier(s) is not counted for resource block, UL transmission may be shifted as null DC subcarrier(s) is not used. Alt (1) or (2) may be applied to null DC subcarrier depending on whether null DC subcarrier in DL is counted for resource block or not.

(3) Consider different set of null DC subcarrier(s) which may be configured by the network. A UE may use null DC subcarrier for transmission. The configured null DC subcarrier may or may not be counted for resource block.

(4) Depending on resource type of UL subband, whether to utilize null DC subcarrier in UL transmission or not may be defined. Similar to DL, the resource type may be defined explicitly or implicitly. For example, if SL resource is configured by LTE carrier, UL transmission in center frequency may be half-subcarrier shifted. In other resource type such as NR resource, half-subcarrier shift or null DC subcarrier may not be used for DC handling. For other purpose (e.g. interference measurement), null DC subcarrier may be still used.

(5) If more than one subcarrier are not counted for resource block, only one (aligned with system center of usage scenario's subband) may be half-subcarrier shifted. In other, resource block definition follows DL and null transmission may be performed. (6) At least when UL/SL utilizes OFDM, approaches for DL may be applied to UL case as well.

(7) UL or SL transmission may be assumed that half-subcarrier may be shifted on a reference subcarrier or frequency. If reference subcarrier or frequency is not given, either center frequency or one of the mechanism mentioned in above may be considered. If a reference subcarrier or frequency is given beyond the system bandwidth of UL or SL transmission (e.g. if UL transmission bandwidth is 10 MHz from f0 to f1, and the reference frequency is given as 'f0-delta'), then half-subcarrier shift may be performed at the reference point and thus all subcarriers may be represented as positively half subcarrier shifted in the signal generation. In other words, center frequency from the signal generation perspective may be placed outside of transmission bandwidth. When half-subcarrier is shifted, in addition to reference frequency which is assumed to be DC subcarrier for half-subcarrier shift, subcarrier spacing (i.e. exact shift value) may also be signaled or may always be assumed to be 15 kHz.

To handle transmitter DC subcarrier, the center frequency may be indicated to the receivers. In case of UL, the alignment of center between UE and network may be done in the following manners.

- A UE may be configured with transmission bandwidth, and the center of the configured transmission bandwidth may be assumed to be center frequency of the UE transmitter.
- A UE may indicate the center frequency semi-statically or dynamically (if center changes). This may be necessary particularly for SL operation or relay.
- A UE may be assumed to have the center frequency of carrier as the center
- A UE may be configured with frequency region which may be equal to or smaller than the bandwidth that the UE can support. DC subcarrier (e.g. at the center) of the configured frequency region may be used assuming that it is the UE TX bandwidth. If a UE supports transmission to the network and at the same time sidelink operation may or may not known to the network, the center DC subcarrier may be fixed aligned with the center of UL. For this matter, system bandwidth (and also frequency) of the UL carrier may be separately indicated.
- A UE may be configured with intended DC subcarrier, and the UE may tune its RF to DC subcarrier regardless of its transmission bandwidth.

5. DC Carrier Handling in In-Band Multiplexing Case

If different numerologies, particularly, different subcarrier spacing frame structure are multiplexed in the same carrier, handling of DC subcarrier needs to be addressed. One simple approach may be assume that no separate DC subcarrier is used and the necessity of DC subcarrier may be handled by performance degradation over two subcarriers in the center frequency or in subband(s) of system bandwidth. If DC subcarrier is used either in a subset of subbands or in some frequencies or in the center, handling DC subcarrier in terms of resource unit/block definition needs to be clarified.

A base numerology used in a host carrier, where the base numerology is defined by synchronization signals and/or by higher layer indication, may be called as the default numerology or default subcarrier spacing. If different subcarrier spacing numerology are multiplexed in the host carrier, handling of DC subcarrier needs to be clarified. First, different numerology or subcarrier spacing which is larger subcarrier spacing than the default subcarrier spacing may be discussed.

(1) If the host carrier has one or more DC subcarrier(s) which are not counted for the resource block/unit definition, at least one of the following approaches may be considered.

Approach 1: Different resource unit definition may be used, and resource unit between different numerologies/subcarrier spacing may not be aligned in frequency domain. For example, with different subcarrier spacing, the same rule of DC subcarrier creation may be achieved, and resource unit may not be aligned due to DC subcarriers.

FIG. 14 shows an example of DC subcarrier handling for different numerologies according to an embodiment of the present invention. Referring to FIG. 14, due to DC subcarrier with different size, resources block for each subcarrier spacing is different from each other in frequency domain and is not aligned. This may lead slightly different system bandwidth with different subcarrier spacing (e.g. (1600+1)*15 kHz with 15 kHz subcarrier spacing, (800+1)*30 kHz with 30 kHz subcarrier spacing, and (400+1)*60 kHz with 60 kHz subcarrier spacing). If multiplexing between different numerology is achieved via FDM, DC subcarrier may be created only by the default numerology or subcarrier spacing such that alignment in frequency domain is also achieved.

Approach 2: Same DC subcarrier may be used regardless of subcarrier spacing which is based on the default numerology. With this approach, signal processing becomes a bit more complicated while it achieves alignments in frequency domain among different numerologies.

Approach 3: Similar to Approach 2, resource block with DC subcarrier may not be used for different numerology. At least, the RB with DC subcarrier may be used for the default numerology only.

(2) If the host carrier has one or more DC subcarrier(s) which may also be counted for the resource block/unit definition, similar mechanisms to create DC subcarriers may be used for different numerology/subcarrier spacing as well.

FIG. 15 shows another example of DC subcarrier handling for different numerologies according to an embodiment of the present invention. Referring to FIG. 15, it is assumed that two DC subcarriers are used. Regardless of whether DC subcarrier (punctured subcarrier by the transmitter) is used or not, the same rule may be applied to different numerology case. If DC subcarrier is not used, same rule may also be applied to different subcarrier spacing.

Second, different numerology or subcarrier spacing which is smaller subcarrier spacing than the default subcarrier spacing may be discussed. In this case, if there is any DC subcarrier which is not counted for resource block or resource element, with smaller subcarrier spacing, there may be ½^n DC subcarriers with subcarrier spacing $SC_i=SC_0*2^n$ (where n is −1, −2, −3 . . . ). In other words, DC subcarrier of the default subcarrier spacing may be used for DC subcarriers for different numerology. Alternatively, two subcarriers may be used for DC subcarriers with smaller subcarrier spacing around the center frequency.

FIG. 16 shows another example of DC subcarrier handling for different numerologies according to an embodiment of the present invention. Referring to FIG. 16, the number of DC subcarriers increase linearly with smaller subcarrier spacing. If only two subcarriers are used for DC subcarriers, the resource unit containing DC subcarrier may have larger number of subcarriers if alignment between different numerology in frequency domain is used.

If DC subcarrier is counted for resource element or resource unit, similar to the case for larger subcarrier spacing, two DC subcarriers around center may be used. Resource block/unit of each numerology may consist of different number of subcarriers instead of the same number of subcarriers. Regardless of resource unit/block definition, the rule of DC subcarrier handling proposed in the present invention may be applied.

In summary, if DC subcarrier is not counted for the default numerology, the similar approach may also be used for other numerology, which may then lead not aligned resource element/unit/block definitions among different subcarrier spacings. To allow better alignment, it may be proposed to consider that DC subcarrier(s) are also counted for resource element/unit/block and one or more subcarriers may be used for DC subcarrier purpose. D subcarriers may be punctured by the transmitter or some performance degradation may be assumed by receiver puncturing on DC subcarriers. In such case, with different numerology, necessary DC subcarriers may be formed and the number of DC subcarriers may be defined either without alignment of resource block among different subcarrier spacings or alignment among different subcarrier spacings. In case of alignment among different subcarrier spacing, if subcarrier spacing is larger than the default subcarrier spacing, the same number of DC subcarriers may be used. If subcarrier spacing is smaller than the default subcarrier spacing, more DC subcarriers may be used to align resource blocks. The extra subcarriers with smaller subcarrier spacing may be used for data transmission. Alternatively, the resource unit/block containing DC subcarriers may consist of larger number of subcarriers compared to other resource units/blocks.

If the resource unit/block size is maintained as same regardless of subcarrier spacing (and thus, actual number of subcarriers in a resource unit decreases with subcarrier spacing), the resource unit containing DC subcarrier(s) may not be used for any data transmission and the entire resource block may be punctured. If subcarrier spacing decreases, the resource unit containing DC subcarrier(s) may include more subcarriers.

6. DC Subcarrier Options in Detail

FIG. 17 shows an example of cases for DC subcarrier handling in an initial access procedure. Network to UE transmission (i.e. DL) may be assumed. FIG. 17-(a) shows a case that TX center is the same as subband center, and synchronization numerology is 15 kHz. FIG. 17-(b) shows a case that TX center is the same as subband center, and synchronization numerology is not 15 kHz. FIG. 17-(c) shows a case that TX center is not the same as subband center, and synchronization numerology is 15 kHz. FIG. 17-(d) shows a case that TX center is not the same as subband center, and synchronization numerology is not 15 kHz.

For handling of DC subcarrier in such cases, the following options may be considered as discussed in earlier part of the present invention.

(1) TX DC subcarrier may be used for data/RS demodulation, and may also be used for synchronization signals if synchronization signal is overlapped with DC subcarrier.

A. TX signal may be shifted by 7.5 kHz on DC subcarrier assuming that 15 kHz is the smallest subcarrier spacing used in the carrier (reference numerology)

B. TX signal may be shifted by ½*SC kHz on DC subcarrier where SC is the subcarrier spacing of the smallest subcarrier spacing supported in the carrier C. TX signal may be shifted by ½*SC kHz on DC subcarrier where SC is the subcarrier spacing of the largest subcarrier spacing supported in the carrier D. TX signal may be shifted by ½*SC kHz on DC subcarrier where SC is the subcarrier spacing used for synchronization signals (default numerology)

E. TX signal may be shifted by ½*SC kHz on DC subcarrier where SC is the subcarrier spacing used for common control and/or data (base numerology)

F. TX signal may not be shifted, and TX may transmit modulation symbols on DC subcarrier (2) TX DC subcarrier may be rate matched or punctured, and may not be used for synchronization signals if synchronization signal is overlapped with DC subcarrier.

A. TX DC subcarrier may carry data, but RS may be punctured/rate matched

B. TX DC subcarrier may be punctured/rate matched with data and RS (data may also include control channel information)

Table 1 shows the design choices/issues of each approach in different cases described in FIG. 17.

TABLE 1

| Approach | Design issues |
| --- | --- |
| (1)-A | Issue 1:<br>Differentiation between case 1/2 and 3/4 are necessary from a UE perspective (7.5 kHz offset)<br>No shift occurs in RX bandwidth in case synchronization signals are not transmitted in the center: A UE cannot assume either shifting or no shifting (or center or non-center) |
| (1)-B | Issue 2: |
| (1)-C | The smallest/largest subcarrier spacing may not be known to UE at synchronization signals. |
| (1)-D | Issue 3: |
| (1)-E | Data numerology may be different from default numerology, and one can be smaller in terms of subcarrier spacing |
| (1)-F | Issue 4:<br>In case a UE performs RX shift to handle DC subcarrier at the receiver side |
| (2)-A | Issue 5: PBCH handling |
| (2)-B | |

To address issue 1, at least one of the following options may be considered.

A UE may always assume that synchronization signals are not shifted. In other words, synchronization signals may always not be placed in the center frequency. This may be useful to minimize signal deterioration particularly for synchronization signals. If FDM of synchronization signals are used between two synchronization signals, empty subcarrier may be placed which may be generally assumed possibly for center frequency or DC subcarrier. In other words, DC subcarrier may be assumed based on synchronization signal location, but not in the center of synchronization signal. One example is that if primary synchronization signal (PSS)/secondary synchronization signal (SSS) are multiplexed by FDM in each 72 subcarriers, one subcarrier between two blocks from PSS-72-subcarrier block (or PBCH block depending on multiplexing between synchronization signal and PBCH) may be reserved for DC subcarrier. Though actual center may be different, to support the case where DC subcarrier/center may be present in the frequency region in which synchronization signals are transmitted, the DC subcarrier may always be empty in OFDM symbols in which synchronization signals (and/or PBCH) are transmitted.

FIG. 18 shows another example of DC subcarrier handling according to an embodiment of the present invention. FIG. 18-(a) shows a case that PSS and SSS/PBCH are multiplexed by FDM, and one subcarrier from both sides is reserved for DC subcarrier. FIG. 18-(b) shows a case that PSS/SSS and PBCH are multiplexed by FDM, and one subcarrier from both sides is reserved for DC subcarrier. FIG. 18-(c) shows a case that PSS/SSS/PBCH are not multiplexed by FDM, but DC subcarrier is configured identically with FIG. 18-(a) or FIG. 18-(b)

Alternatively, a UE may assume that synchronization signals are always transmitted in the center frequency. In either way, basic assumption on the relationship between center frequency and the location of synchronization signals may be fixed regardless of actual transmission of synchronization signals. If synchronization's center is not the system bandwidth's center, initial system bandwidth may not include any DC subcarrier within its initial system bandwidth. Otherwise, ambiguity in synchronization signal may be present. The center location may be signaled via PBCH, and the signals after PBCH may be transmitted including DC subcarrier.

To address issue 2, the smallest/largest subcarrier spacing supported by a NR carrier may be specified. This may be defined per band or frequency region (e.g. 15 kHz subcarrier spacing for below 6 GHz, 60 kHz subcarrier spacing for above 6 GHz).

To address issue 3, if default numerology (numerology used for synchronization signals) uses larger subcarrier spacing (e.g. 60 kHz) and data uses smaller subcarrier spacing (e.g. 15 kHz), the number of subcarriers mapped to half-subcarrier shift may be larger than 1 for data. In this sense, when data is scheduled in different OFDM symbols from synchronization signals, shift value may be different per symbol or per slot. In other words, signal generation may be different per symbol. If a UE does not need to read synchronization signals where the network may have transmitted synchronization signals, the network and UE may have different assumption on the shifted value. To avoid this issue, data may also use the same shift value to synchronization symbols, and it is possible that a few subcarriers may be lost due to half-carrier shift. For example, if data uses 15 kHz subcarrier spacing, it may correspond to 2 subcarriers if half-subcarrier based on 60 kHz subcarrier spacing is used. In other words, smaller subcarrier spacing may lose some subcarriers due to half-carrier shift based on the large subcarrier spacing. Similarly, if common channel's numerology is used for shifting value, in case synchronization signal uses the smaller subcarrier spacing, the similar issue exists.

To address issue 4, when half-subcarrier shifting is not used in TX side, to address DC subcarrier issue, the receiver may still process data by shifting half-subcarrier to put RX's center in the null point of the subcarriers. As different numerology may be used in each OFDM symbol and each slot, the basic assumption on numerology on UE side needs to be clarified. One simple mechanism is to assume that a UE may use separate RF on subbands with single numerology at each OFDM symbol. Alternatively, regardless of RF, a UE may perform RX-side shifting at a subband with single numerology. If a UE receives multiple numerologies at a given time, multiple decoding on different values of shifting may be used. In other words, for each subband with a single numerology, a UE may perform RX side shifting per different OFDM symbol. If different numerology is used between control and data, shifting value may be different between control and data.

To address issue 5, if PBCH is rate matched on DC subcarrier, a UE needs to know whether PBCH is transmitted over DC subcarrier or not. If synchronization signal(s) are transmitted in DC subcarrier, depending on mapping between synchronization signals and PBCH, PBCH may or may not be carried over DC subcarrier. Thus, similar to Issue 1, to utilize this approach, a UE needs to know the relationship between DC subcarrier and synchronization signals. If a UE assumes that synchronization signal does not span over DC subcarrier, similar assumption may be necessary for PBCH mapping as well. If synchronization signals may go over DC subcarrier, the receiver may still need to receive the signal by shifting half-subcarrier. In this sense, if this approach is used, it is generally desirable that synchronization signals/RS may also not be mapped to DC subcarrier similar to data. Also, issues for multiplexing cases of different numerologies may also be applied in this case.

Furthermore, a case of UE to network transmission (i.e. UL transmission), which also may be applied to SL and possibly backhaul signaling, may be discussed. Similar issue may also apply to DL if a UE receives from multiple TX/RX points (TRPs) or gNBs. If there is a single TX, the issue may same as DL case in the above. Here, further considerations for UL for the following occasions may be discussed. Physical random access channel (PRACH) may be transmitted not in the center of the system bandwidth, and a UE may not be aware of the center of system bandwidth. For example, if a UE assumes that synchronization is transmitted over the DC subcarrier or over the center (where actual center is different), different UEs may assume different center frequency. Also, when PRACH is configured in different frequency location, a UE may tune its center at the center of PRACH bandwidth. In such a case, different UEs would have different center. One approach to address this is to align the system bandwidth of a UE, and perform shift or no shift based on the system bandwidth similar to enhanced machine-type communication (eMTC)/narrowband internet-of-thigs (NB-IoT) approach. This may require a UE to know the center frequency of the system bandwidth if Option (1) is used. In this case, regardless of signal generation, if the PRACH transmission spans DC subcarrier, the signal quality may be damaged. One approach to mitigate this is to mandate a UE transmit PRACH not passing DC subcarrier (i.e. place DC subcarrier/center outside of PRACH bandwidth). To allow this, a UE needs to support at least twice of PRACH bandwidth. In other words, PRACH bandwidth may be half of UE minimum system bandwidth capability. For example, when minimum supported bandwidth is 5 MHz, PRACH bandwidth may be 2.5MHz.

Considering multiple UEs with different frequency regions allocated where different UEs may have different center frequency, the following approaches may be generally desired.

The center of system bandwidth (reference center) may be known to all UEs such that signal generation can be based on reference center. Reference center may be different from actual center of system bandwidth or center of transmitter. Center of synchronization signals may be the reference center. Or, the reference center may be configured by PBCH or based on system bandwidth of the carrier. The reference center may be assumed regardless of synchronization signals.

A transmitter may not use any shift. Important messages such as PRACH may be transmitted without passing DC subcarrier by enlarging RF bandwidth or making center outside of transmission bandwidth.

As discussed earlier, if a UE needs to support LTE and NR UL simultaneously, NR and LTE may be transmitted in different time, or signal generation may follow LTE if simultaneous transmission is necessary.

FIG. 19 shows a method for operating in a NR carrier by a UE according to an embodiment of the present invention. The present invention described above may be applied to this embodiment.

In step S100, the UE receives an indication of a system bandwidth and a center frequency of the system bandwidth from a network. In step S110, the UE operates subbands in the NR carrier according to the indication. The center frequency of the system bandwidth corresponds to a DC subcarrier.

The indication may be received regardless of subband location in which the UE is served. The NR carrier may coexist with a long-term evolution (LTE) carrier. A center frequency of the LTE carrier may correspond the DC subcarrier. A gap between a center frequency of the NR carrier and a center frequency of the LTE carrier may be multiple 15 kHz. The subbands in the NR carrier for UL transmission or SL transmission may be shifted by either half-subcarrier or 7.5 kHz. A center frequency of UL in a LTE carrier may be shifted by 7.5 kHz. A vehicle-to-vehicle (V2V) communication via SL may be performed in the LTE carrier. Synchronization signals may be transmitted in the subbands in the NR carrier without shifting. PRACH may be transmitted in the subbands in the NR carrier by not passing the null DC subcarrier.

FIG. 20 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, DC subcarrier can be handled efficiently in a NR carrier for flexible and dynamic subband operations.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   transmitting information on a direct current (DC) subcarrier for a new radio access technology (NR) carrier to a NR network,
   wherein the information on the DC subcarrier includes presence of the DC subcarrier;
   receiving frequency information for the NR carrier from the NR network in response to the transmitted information on the DC subcarrier,
   wherein the frequency information for the NR carrier is configured by the NR network based on the transmitted information on the DC subcarrier, and
   wherein the frequency information for the NR carrier informs that a center frequency of the NR carrier is shifted by 7.5 kHz; and
   performing an uplink (UL) transmission to the NR network via the NR carrier based on the frequency information for the NR carrier,
   wherein the NR carrier and a long-term evolution (LTE) carrier used for a LTE network coexist in a single frequency band and use a single radio frequency (RF), and
   wherein the UL transmission is performed based on shifting the center frequency of the NR carrier by 7.5 kHz.

2. The method of claim 1, wherein a gap between the center frequency of the NR carrier and a center frequency of the LTE carrier is multiple of 15 kHz.

3. The method of claim 1, wherein a center frequency of the LTE carrier is shifted by 7.5 kHz.

4. The method of claim 3, wherein a vehicle-to-vehicle (V2V) communication via a sidelink (SL) is performed in the LTE carrier.

5. The method of claim 1, wherein synchronization signals are received from the NR network via the NR carrier without shifting.

6. The method of claim 1, wherein a physical random access channel (PRACH) is transmitted to the NR network via the NR carrier by not passing the center frequency of the NR carrier.

7. A user equipment (UE) in a wireless communication system, the UE comprising:
   a memory;
   a transceiver; and
   a processor, coupled to the memory and the transceiver, configured to:
   control the transceiver to transmit information on a direct current (DC) subcarrier for a new radio access technology (NR) carrier to a NR network,
   wherein the information on the DC subcarrier includes presence of the DC subcarrier,
   control the transceiver to receive frequency information for the NR carrier from the NR network in response to the transmitted information on the DC subcarrier,
   wherein the frequency information for the NR carrier is configured by the NR network based on the transmitted information on the DC subcarrier, and
   wherein the frequency information for the NR carrier informs that the a center frequency of the NR carrier is shifted by 7.5 kHz, and
   control the transceiver to perform uplink (UL) transmission to the NR network via the NR carrier based on the frequency information for the NR carrier, wherein the NR carrier and a long-term evolution (LTE) carrier used for a LTE network coexist in a frequency band and use a single radio frequency (RF), and wherein the UL transmission is performed based on shifting the center frequency of the NR carrier by 7.5 kHz.

8. The UE of claim 7, wherein a gap between the center frequency of the NR carrier and a center frequency of the LTE carrier is multiple of 15 kHz.

\* \* \* \* \*